US012333918B2

(12) United States Patent
Hsieh et al.

(10) Patent No.: US 12,333,918 B2
(45) Date of Patent: Jun. 17, 2025

(54) ONE-TIME ACTIVATION SMOKE ALARM

(71) Applicant: EVERDAY TECHNOLOGY CO., LTD., Yilan County (TW)

(72) Inventors: Shih-Hsiung Hsieh, Yilan County (TW); Yi-Shan Wu, Yilan County (TW)

(73) Assignee: EVERDAY TECHNOLOGY CO., LTD., Yilan County (TW)

( * ) Notice: Subject to any disclaimer, the term of this patent is extended or adjusted under 35 U.S.C. 154(b) by 93 days.

(21) Appl. No.: 18/536,244

(22) Filed: Dec. 12, 2023

(65) Prior Publication Data

US 2025/0014441 A1 Jan. 9, 2025

(30) Foreign Application Priority Data

Jul. 3, 2023 (TW) ................................ 112206839

(51) Int. Cl.
*G08B 17/10* (2006.01)
*G08B 17/113* (2006.01)
*G08B 29/18* (2006.01)

(52) U.S. Cl.
CPC ............ *G08B 17/10* (2013.01); *G08B 17/113* (2013.01); *G08B 29/181* (2013.01)

(58) Field of Classification Search
CPC ..... G08B 17/10; G08B 29/181; G08B 17/113
See application file for complete search history.

(56) References Cited

U.S. PATENT DOCUMENTS

| | | | | |
|---|---|---|---|---|
| 4,525,703 A * | 6/1985 | Bellino | G08B 17/113 D10/106.2 |
| 4,870,395 A * | 9/1989 | Belano | G08B 29/145 248/550 |
| 6,494,425 B2 * | 12/2002 | Soloway | G08B 13/19 174/54 |
| 8,089,769 B2 * | 1/2012 | Casey | G08B 17/113 361/728 |
| 11,137,133 B2 * | 10/2021 | Huang | F21V 21/02 |

* cited by examiner

*Primary Examiner* — John A Tweel, Jr.
(74) *Attorney, Agent, or Firm* — Li & Cai Intellectual Property Office

(57) ABSTRACT

A one-time activation smoke alarm includes a smoke alarm body and a wall-hanging base. The smoke alarm body includes a case and a sliding sheet. An engaging recessed slot and a supporting protrusion platform are respectively formed on two sides of a bottom of the case. The sliding sheet is slidably disposed on the supporting protrusion platform, and a front end of the sliding sheet has a pressed protrusion portion that extends into the engaging recessed slot. An engaging protrusion platform is formed on the wall-hanging base, and at least one abutting protrusion portion protrudes outward from a periphery of the engaging protrusion platform. The engaging protrusion platform and the engaging recessed slot are capable of being engaged and fixed together such that the abutting protrusion portion abuts the pressed protrusion portion and the smoke alarm body activates a detection function.

12 Claims, 22 Drawing Sheets

ONE-TIME ACTIVATION SMOKE ALARM

CROSS-REFERENCE TO RELATED PATENT APPLICATION

This application claims the benefit of priority to Taiwan Patent Application No. 112206839, filed on Jul. 3, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a smoke alarm, and more particularly to a one-time activation smoke alarm.

BACKGROUND OF THE DISCLOSURE

Fire alarm devices are generally installed indoors for prevention of fire hazards. Conventional fire alarm devices are activated by a user manually pushing a slider of a slide switch on the fire alarm devices, and can be turned off pushing the slider of the slide switch again. Thus, a requirement of the UL 217 standard is difficult to be met, which regulates that a fire alarm device having a 10-year battery life cannot be turned off after being activated.

SUMMARY OF THE DISCLOSURE

In response to the above-referenced technical inadequacies, the present disclosure provides a one-time activation smoke alarm capable of effectively improving the deficiencies of the conventional smoke alarm.

In order to solve the above-mentioned problems, one of the technical aspects adopted by the present disclosure is to provide a one-time activation smoke alarm. The one-time activation smoke alarm includes a smoke alarm body and a wall-hanging base. The smoke alarm body includes a case and a sliding sheet. An engaging recessed slot is recessed at one side of a bottom of the case, so that a supporting protrusion platform protrudes from a corresponding position on another side of the bottom of the case. The sliding sheet is slidably disposed on the supporting protrusion platform. The sliding sheet is capable of sliding to shift a slide switch for the smoke alarm body to turn on a detection function, and a front end of the sliding sheet has a pressed protrusion portion that extends into the engaging recessed slot. One side of the wall-hanging base is configured to be disposed on a wall surface, an engaging protrusion platform protrudes from another side of the wall-hanging base, and at least one abutting protrusion portion protrudes outward from a periphery of the engaging protrusion platform. The engaging protrusion platform and the engaging recessed slot are capable of being engaged and fixed to each other, so that the at least one abutting protrusion portion abuts against a pressed oblique surface formed on the pressed protrusion portion in the engaging recessed slot to move the sliding sheet forward from a first position to a second position, and a slider of the slide switch is synchronously moved forward from a turned-off position to a turned-on position such that the smoke alarm body is powered on to turn on the detection function. The sliding sheet is connected to a backward-proofing mechanism that is configured to prevent the sliding sheet from moving backward such that the sliding sheet is unable to move backward from the second position to the first position, and the slider of the slide switch is unable to move backward from the turned-on position to the turned-off position such that the smoke alarm body is unable to turn off the detection function after turning on the detection function.

Therefore, in the one-time activation smoke alarm provided by the present disclosure, an engaging recessed slot is recessed at a bottom of the case of the smoke alarm body, an engaging protrusion platform protrudes from the wall-hanging base, and the engaging protrusion platform and the engaging recessed slot are capable of being engaged and fixed to each other. Thus, the smoke alarm body can be disposed on a wall surface through the wall-hanging base. A supporting protrusion platform protrudes from the bottom of the case, and a sliding sheet is slidably disposed on the supporting protrusion platform. A front end of the sliding sheet has a pressed protrusion portion that extends into the engaging recessed slot, and an abutting protrusion portion protrudes outward from a periphery of the engaging protrusion platform. Therefore, when the engaging protrusion platform and the engaging recessed slot are rotated and engaged to each other, the abutting protrusion portion abuts against a pressed oblique surface formed on the pressed protrusion portion in the engaging recessed slot to move the sliding sheet forward by one position. Moreover, the slide switch is synchronously moved forward by one position such that the smoke alarm body turns on the detection function. In addition, the sliding sheet is connected to a backward-proofing mechanism that prevents the sliding sheet from moving backward being moved forward, such that the smoke alarm body is unable to turn off the detection function after turning on the detection function. Furthermore, when the smoke alarm has reached the end of product life and the smoke alarm needs to be discarded, the sliding sheet can be shifted to move the slide switch so that the smoke alarm is switched to performing a discharging function. At this time, a blocking protrusion portion formed on a rear end of the sliding sheet becomes exposed from being hidden due to the shifting, and the blocking protrusion portion is connected to the backward-proofing mechanism. Therefore, after a user shifts the sliding sheet to switch the smoke alarm to perform the discharging function, the blocking protrusion portion on the rear end of the sliding sheet interferes with the engaging protrusion platform of the wall-hanging base. In this way, the smoke alarm is unable to be rotated and fixed to the wall-hanging base, thereby meeting the requirement of the UL 217 standard.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
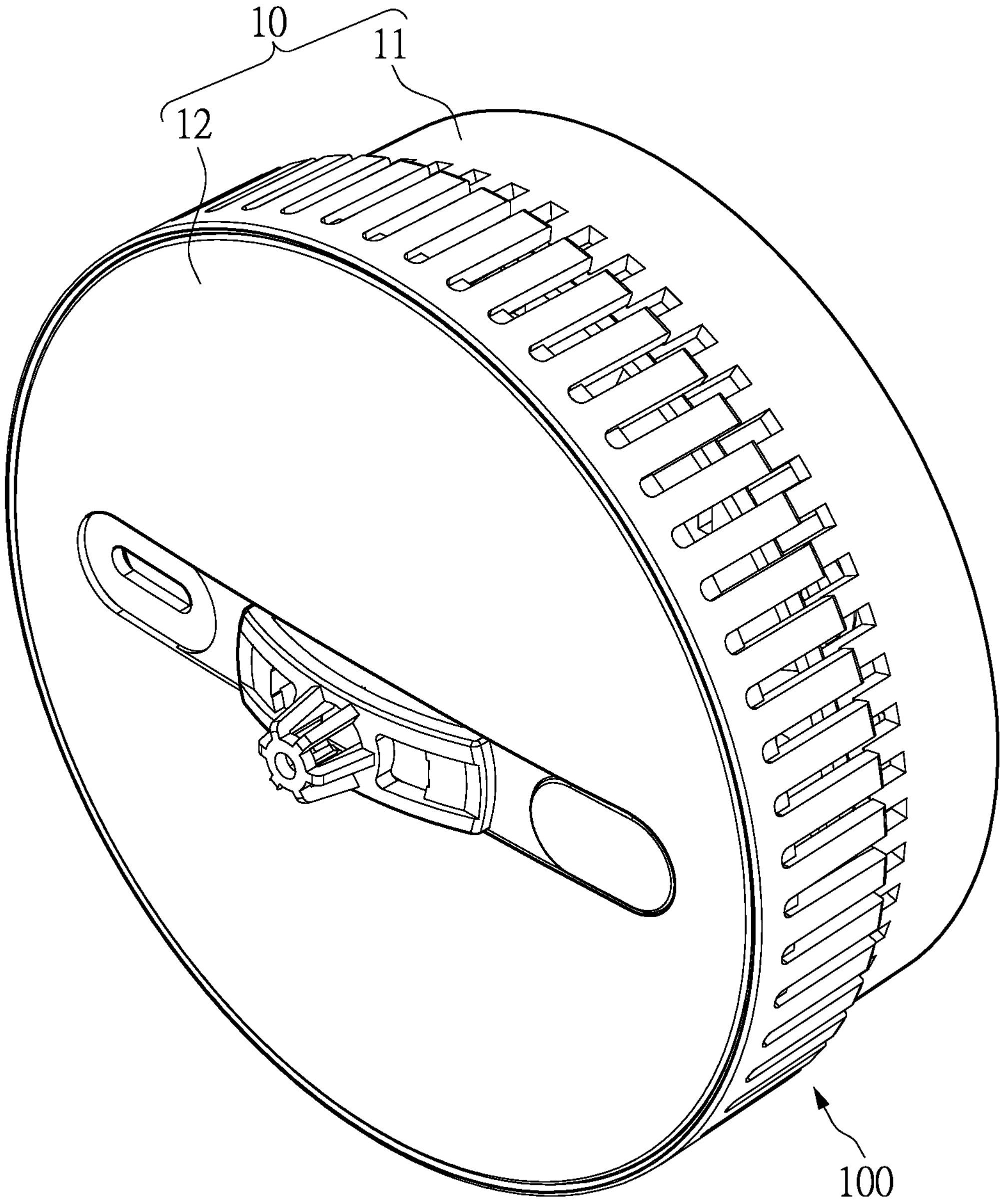
FIG. 1 is a schematic perspective view of a one-time activation smoke alarm according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

The present disclosure provides a one-time activation smoke alarm, that is, a smoke alarm that is incapable of being turned off after being turned on, so as to meet requirements of the UL 217 standard.

Figure 2:
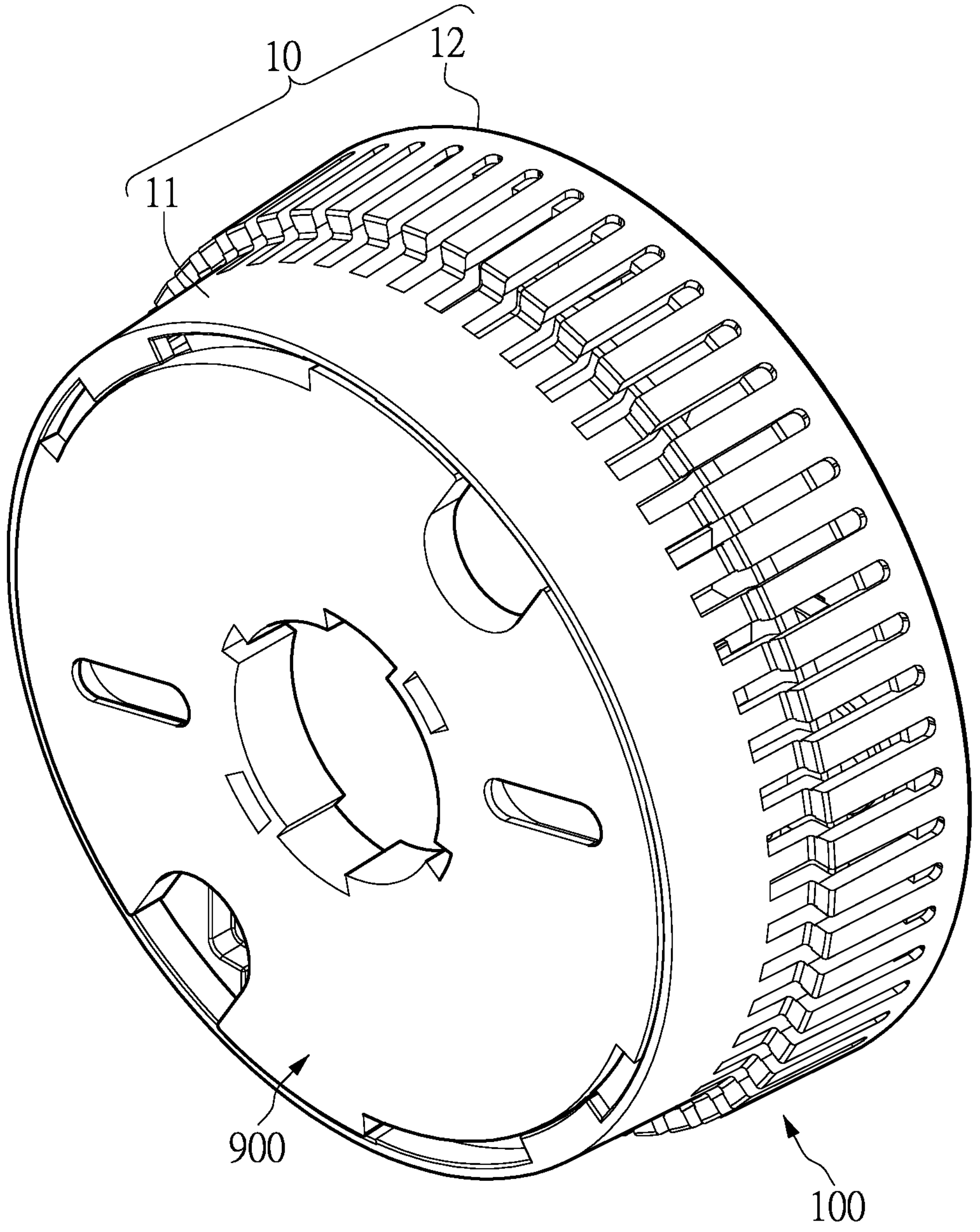
FIG. 2 is another schematic perspective view of the one-time activation smoke alarm according to the first embodiment of the present disclosure.

Reference is made to FIG. 1 to FIG. 11, which illustrate a one-time activation smoke alarm provided by a first embodiment of the present disclosure. As shown in FIG. 1 and FIG. 2, in the present disclosure, the one-time activation smoke alarm includes a smoke alarm body 100 and a wall-hanging base 900. The smoke alarm body 10 can detect abnormal smoke in the environment, and emit audio or light alarms when abnormal smoke is detected in the environment. Furthermore, the smoke alarm body 100 can be disposed on a wall surface (e.g., a ceiling of a living room or a kitchen) via the wall-hanging base 900.

Figure 3:
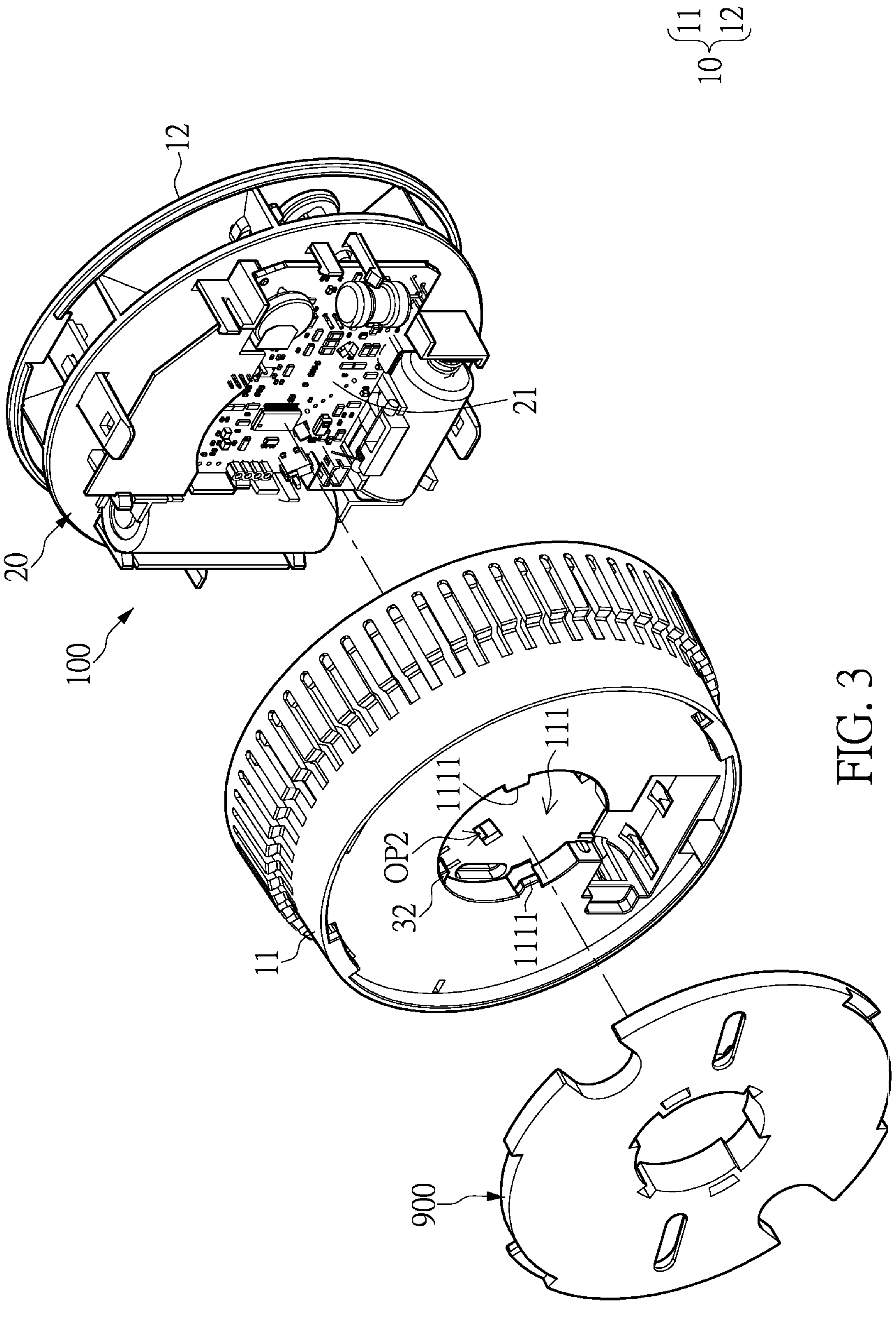
FIG. 3 is an exploded view of the one-time activation smoke alarm according to the first embodiment of the present disclosure.
Figure 4:
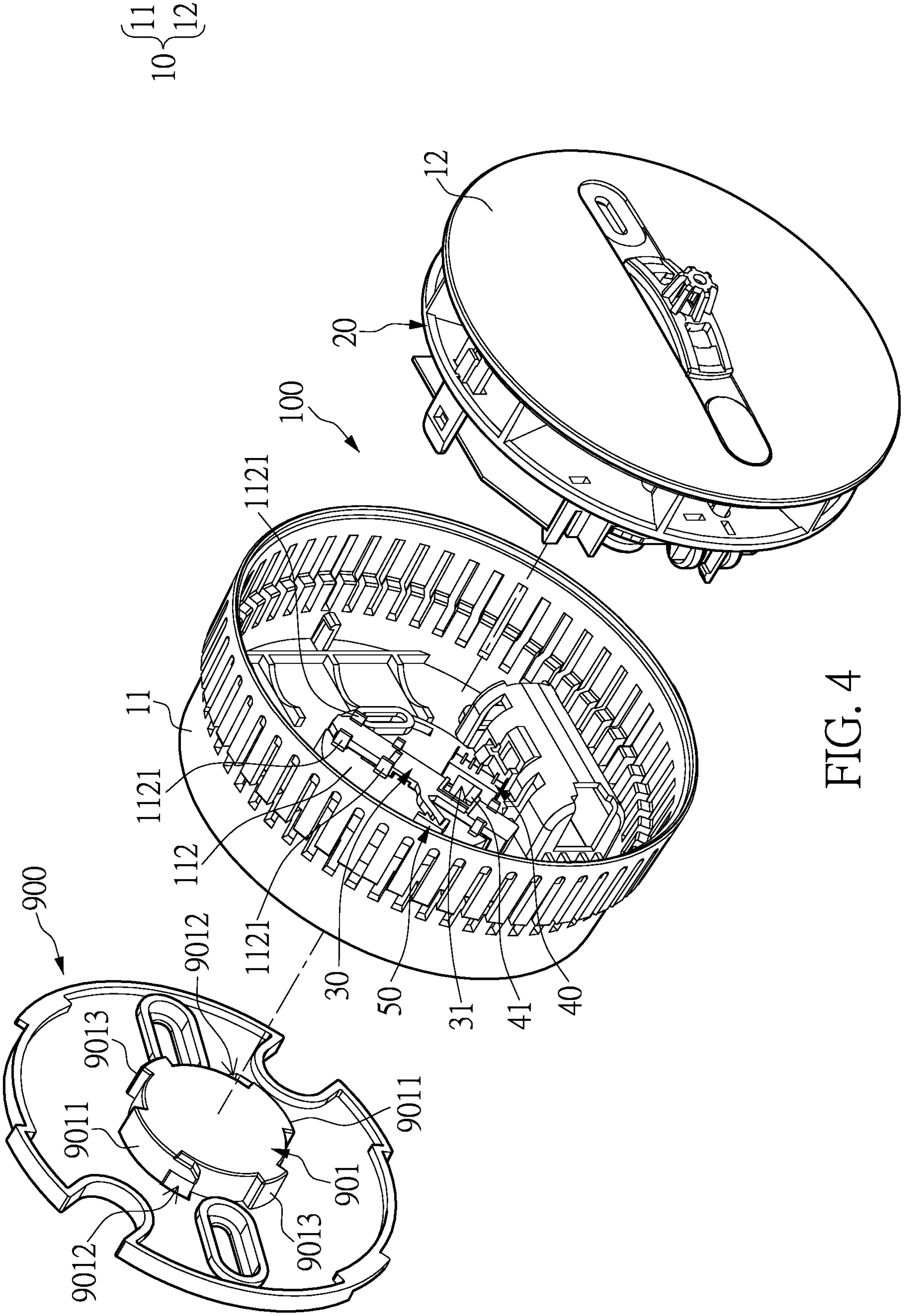
FIG. 4 is another exploded view of the one-time activation smoke alarm according to the first embodiment of the present disclosure.
Figure 5:
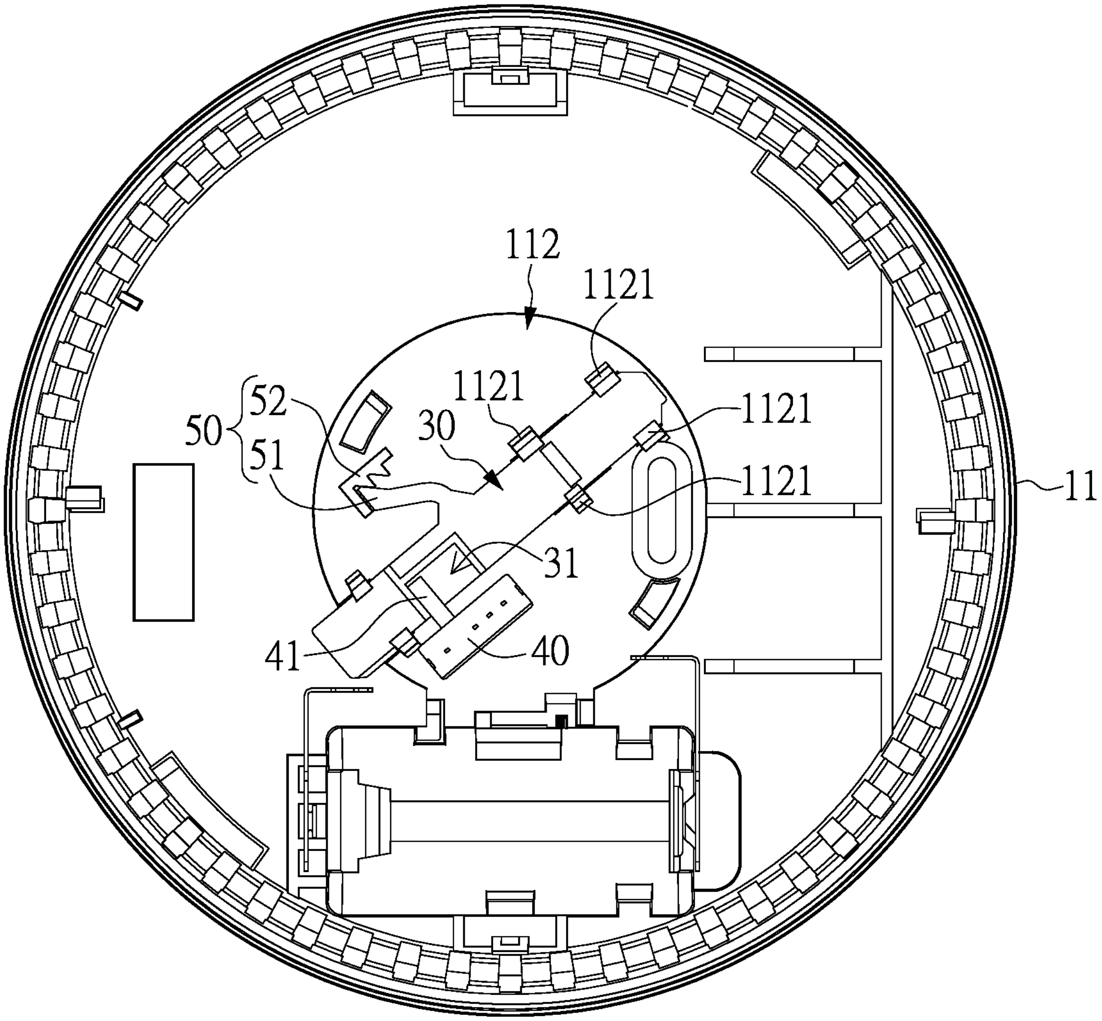
FIG. 5 is a schematic top view of a first case and a sliding sheet of the one-time activation smoke alarm according to the first embodiment of the present disclosure.
Figure 6:
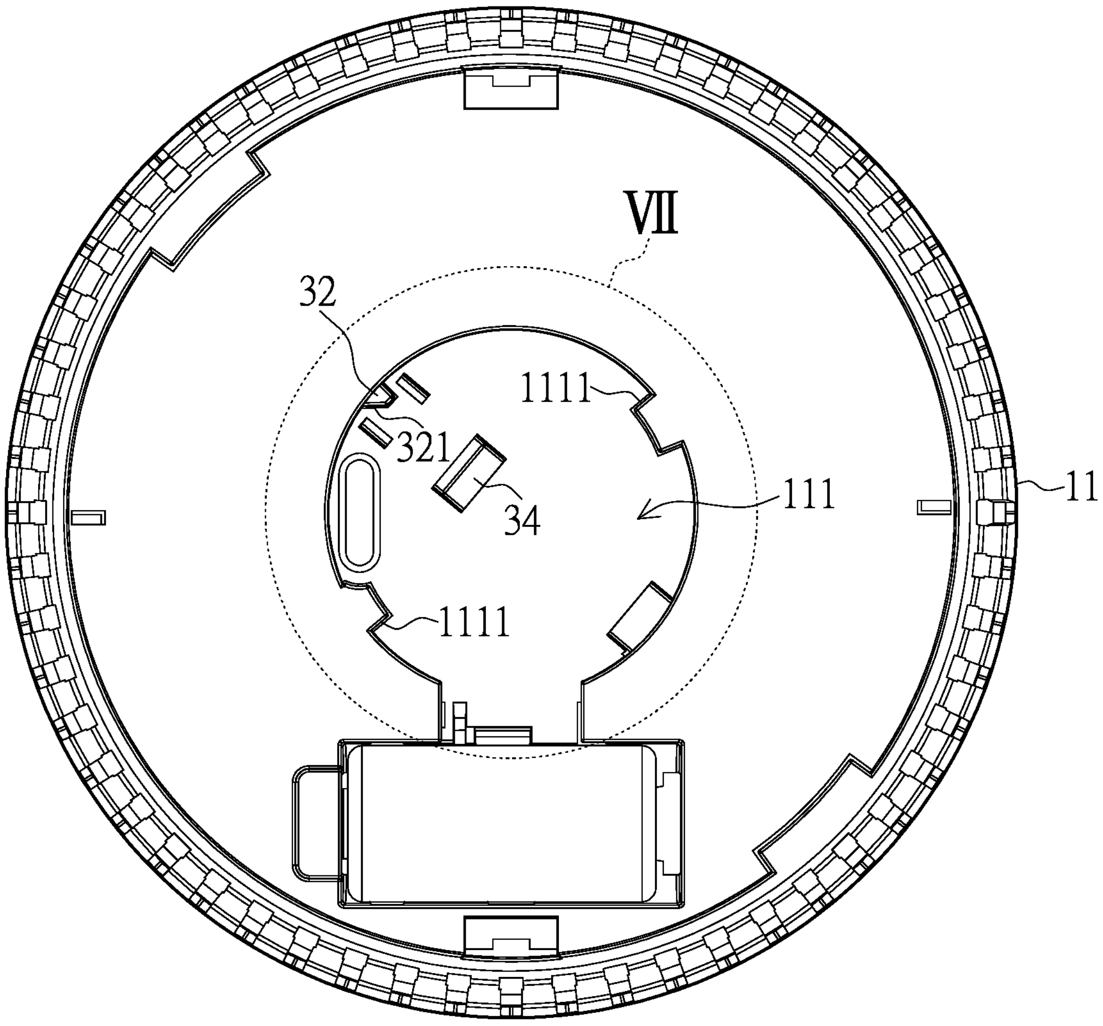
FIG. 6 is a schematic bottom view of the first case and the sliding sheet of the one-time activation smoke alarm according to the first embodiment of the present disclosure.

Moreover, the smoke alarm body 100 includes a case 10, and an engaging recessed slot 111 is recessed at one side of a bottom of the case 10 (as shown in FIG. 3), so that a supporting protrusion platform 112 protrudes from a corresponding position on another side of the bottom of the case (as shown in FIG. 4).

In this embodiment, the case 10 can include a first case 11 and a second case 12 that are assembled to each other, and the engaging recessed slot 111 and the supporting protrusion platform 112 can be formed on two opposite sides of a bottom of the first case 11. The first case 11 can be a bottom case, the second case 12 can be a top case, and an accommodating space can be defined between the first case 11 and the second case 12. The smoke alarm body 100 includes a smoke detector element 20, and the smoke detector element 20 can be accommodated in the accommodating space defined between the first case 11 and the second case 12. As a manner of implementing the smoke detecting unit 20 is not limited in this embodiment, the smoke detecting unit 20 can be a heat-sensitive detecting unit, a smoke-sensitive detecting unit, or a heat-sensitive and smoke-sensitive compound detecting unit, but is not limited thereto.

The smoke alarm body 100 further includes a sliding sheet 30, and the sliding sheet 30 is slidably disposed on the supporting protrusion platform 112. In this embodiment, the supporting protrusion platform 112 is substantially cylindrically-shaped, the sliding sheet 30 is substantially strip-shaped, and a length of the sliding sheet 30 is substantially equal to a diameter of the supporting protrusion platform 112. Furthermore, the sliding sheet 30 is capable of sliding to shift the slide switch 40 for the smoke alarm body 100 to turn on a detection function. That is, when the sliding sheet 30 slides, the slide switch 40 is synchronously driven to slide, so that the smoke alarm body 100 is powered on to turn on the detection function. In this embodiment, a concave slot 31 is formed on a top surface and between a front end and a rear end of the sliding sheet 30, and the slider 41 of the slide switch 40 extends into the concave slot 31, such that when the sliding sheet 30 slides, the slider 41 of the slide switch 40 is synchronously moved by a slot wall of the concave slot 31.

Furthermore, the slide switch 40 is electrically connected to a circuit board 21 of the smoke detector element 20. That is, the slide switch 40 can be soldered to the circuit board 21 of the smoke detector element 20, or connected to the circuit board 21 of the smoke detector element 20 via wires. The slide switch 40 can be a 1P3T switch, that is, the slider 41 of the slide switch 40 can move between three positions. When the slider 41 of the slide switch 40 is located in a turned-off position (OFF position), the smoke alarm body 100 is in an off-state, and the detection function is not activated. When the slider 41 of the slide switch 40 is located in a turned-on position (ON position), the smoke alarm body 100 is in an on-state, and the smoke alarm body 100 can be controlled to activate the detection function for detecting abnormal smoke in the environment. In addition, when the slider 41 of the slide switch 40 is located in a discharging position, the smoke alarm body 100 can be controlled to be in a discharging state, and the smoke alarm body 100 can be controlled to activate a discharging function so that remaining power can be depleted.

Figure 7:
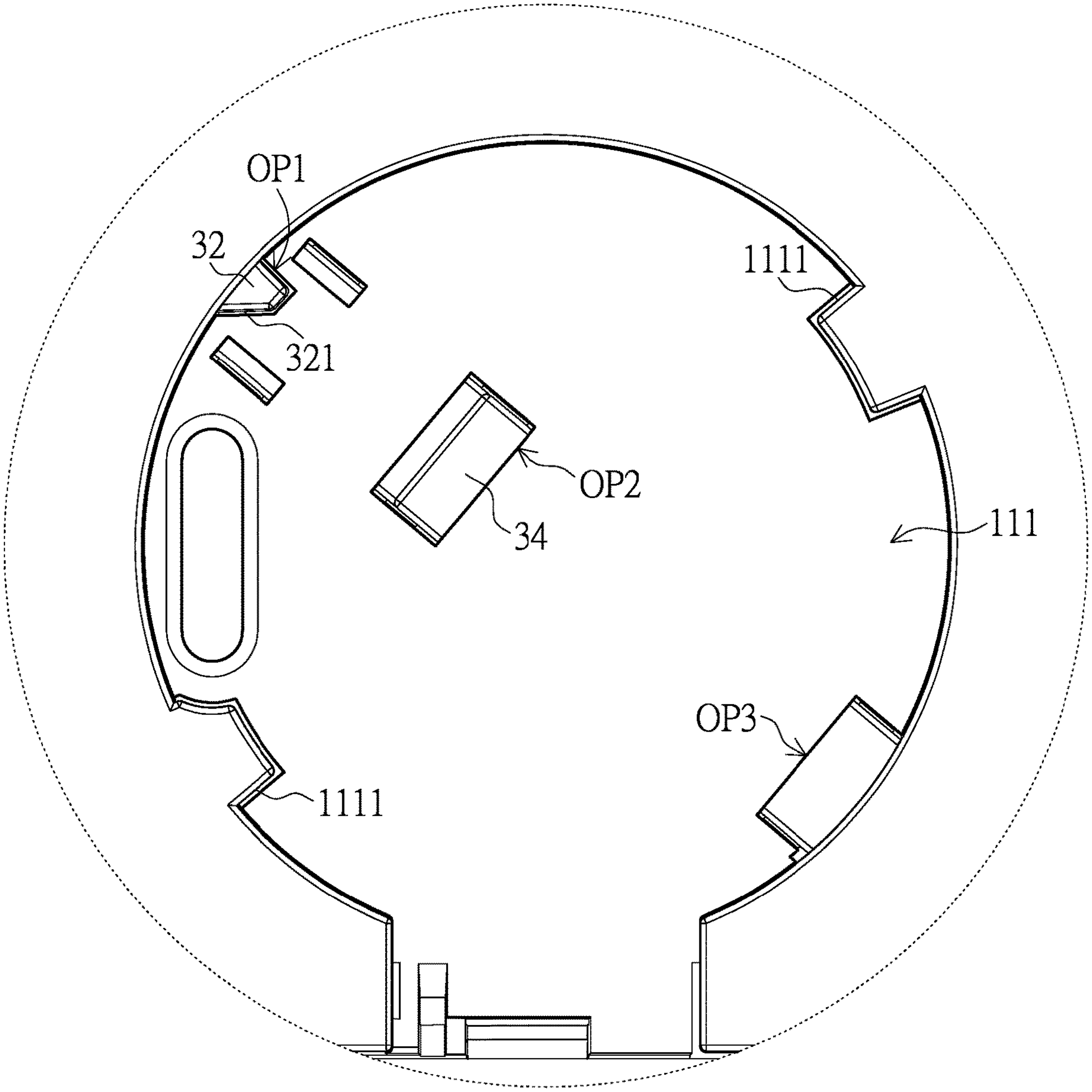
FIG. 7 is a schematic enlarged view of part VII of FIG. 6.

In addition, as shown in FIG. 3 and FIG. 7, a front end of the sliding sheet 30 has a pressed protrusion portion 32 that extends into the engaging recessed slot 111. Moreover, a first opening OP1 corresponding to the pressed protrusion portion 32 is formed on a slot wall of the engaging recessed slot 111, so that the pressed protrusion portion 32 extends into the engaging recessed slot 111 through the first opening OP1.

As shown in FIG. 4, one side of the wall-hanging base 900 is configured to be disposed on a wall surface, an engaging protrusion platform 901 protrudes from another side of the wall-hanging base 900, and the engaging protrusion platform 901 is substantially cylinder-shaped. Furthermore, the engaging protrusion platform 901 of the wall-hanging base 900 and the engaging recessed slot 111 of the smoke alarm body 100 are capable of being engaged and fixed to each other by manners of rotation and engagement, so that the smoke alarm body 100 can be disposed on the wall surface through the wall-hanging base 900.

Furthermore, an engaging protrusion portion 9011 protrudes outward from a periphery of the engaging protrusion platform 901. In this embodiment, two engaging protrusion portions 9011 protrude outward from opposite positions on the periphery of the engaging protrusion platform 901. An engaging protruded block 1111 is recessed from a slot wall of the engaging recessed slot 111. In this embodiment, two engaging protruded blocks 1111 are recessed from opposite positions on the slot wall of the engaging recessed slot 111. Moreover, at least one engaging protruded block 1111 is capable of entering an engaging slot 9012 formed by at least one engaging protrusion portion 9011 by a rotation movement, so that the engaging protrusion platform 901 and the engaging recessed slot 111 are capable of being engaged and fixed to each other by manners of rotation and engagement. Because the engaging protrusion platform 901 and the engaging recessed slot 111 are engaged and fixed to each other by manners of rotation, an inconvenience of requiring an accurate calibration can be avoided to facilitate easy mounting.

Figure 8:
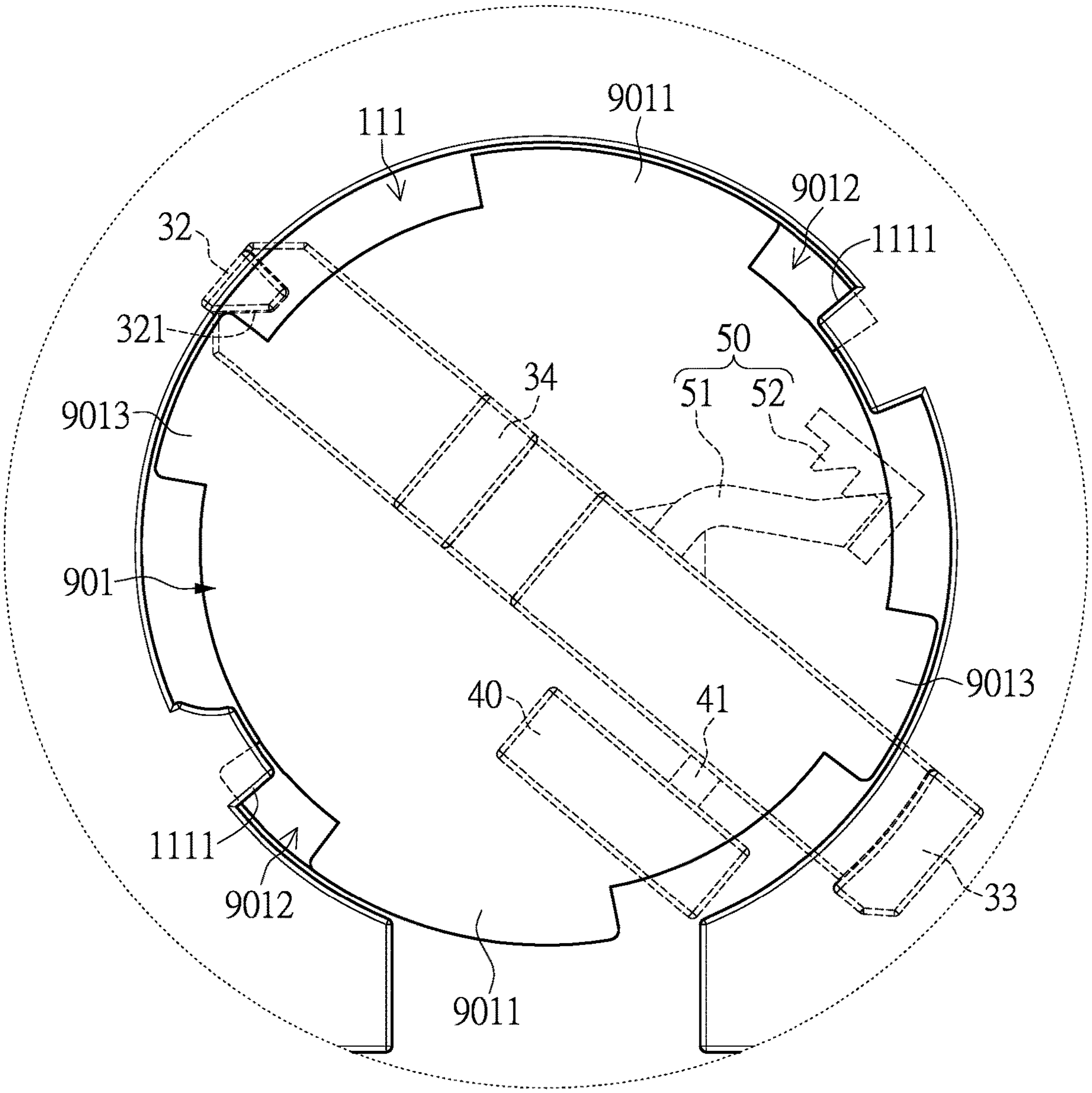
FIG. 8 is a schematic view of an engaging protrusion platform and an engaging recessed slot of the one-time activation smoke alarm according to the first embodiment of the present disclosure during rotation and engaging.
Figure 9:
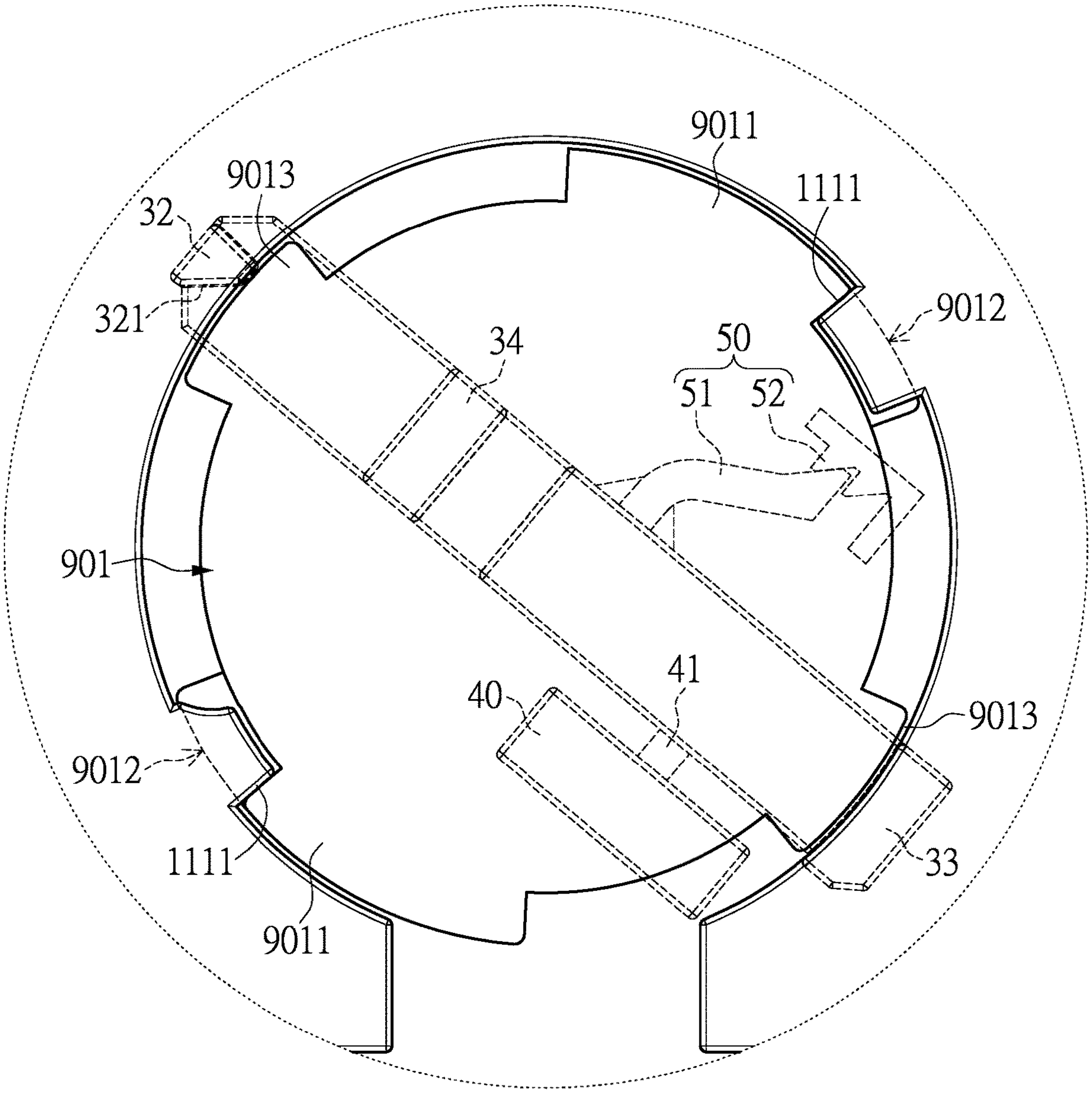
FIG. 9 is a schematic view of an engaging protrusion platform and an engaging recessed slot of the one-time activation smoke alarm according to the first embodiment of the present disclosure after rotation and engaging.

Furthermore, at least one abutting protrusion portion 9013 protrudes outward from the periphery of the engaging protrusion platform 901. In this embodiment, two abutting protrusion portions 9013 protrude outward from opposite positions on the periphery of the engaging protrusion platform 901. That is, two engaging protrusion portions 9011 that are oppositely located and two abutting protrusion portions 9013 that are oppositely located protrude outward from the periphery of the engaging protrusion platform 901. Referring to FIGS. 3, 4, and 8, when the engaging protrusion platform 901 and the engaging recessed slot 111 are engaged and fixed to each other by manners of rotation, the abutting protrusion portions 9013 of the engaging protrusion platform 901 can abut against a pressed oblique surface 321 formed on the pressed protrusion portion 32 in the engaging recessed slot 111 to move the sliding sheet 30 forward by one position along a longitudinal direction of the sliding sheet 30. Therefore, the sliding sheet 30 is moved from a first position (as shown in FIG. 8) to a second position (as shown in FIG. 9), and the slider 41 of the slide switch 40 is synchronously moved forward from a turned-off position to a turned-on position such that the smoke alarm body 100 is powered on to turn on the detection function. That is, after the smoke alarm body 100 is engaged to the wall-hanging base 900 by a manner of rotation, the detection function can be activated.

In addition, a plurality of limiting hooks 1121 can be formed on the supporting protrusion platform 112, the limiting hooks 1121 are arranged in pairs and opposite to each other along a longitudinal direction of the sliding sheet 30 to limit the sliding sheet 30 to only being able to move along the longitudinal direction of the sliding sheet 30 and to prevent the sliding sheet 30 from detaching from the supporting protrusion platform 112.

Moreover, the sliding sheet is connected to a backward-proofing mechanism 50 that is configured to prevent the sliding sheet 30 from moving backward along the longitudinal direction of the sliding sheet 30. Therefore, after the sliding sheet 30 is moved forward from the first position to the second position, the sliding sheet 30 is unable to move backward from the second position to the first position, and the slider 41 of the slide switch 40 is unable to move backward from the turned-on position to the turned-off position, such that the smoke alarm body 100 is unable to turn off the detection function after turning on the detection function.

In detail, the backward-proofing mechanism 50 includes an elastic arm 51 that extends outward from a side edge of the sliding sheet 30 and a ratchet structure 52 formed on the supporting protrusion platform 112, and an inclined surface of a free end of the elastic arm 51 is in contact with an inclined surface of the ratchet structure 52. When the sliding sheet 30 is moved forward, the inclined surface of the ratchet structure 52 abuts against the inclined surface of the elastic arm 51, so that the elastic arm 51 is elastically deformed and then recovers to engage with the ratchet structure 52, such that the sliding sheet 30 is capable of moving forward by one position. Moreover, a straight surface of the free end of the elastic arm 51 abuts against a straight surface of the ratchet structure 52, so that the sliding sheet 30 is unable to move backward to the original position. Therefore, the backward-proofing mechanism 50 of this embodiment can prevent the sliding sheet 30 from moving backward.

Furthermore, when the smoke alarm has reached the end of product life and the smoke alarm needs to be discarded, the smoke alarm needs to discharge electric power to prevent any hazards that may be caused by the remaining electric power, thereby meeting the requirement of the UL 217 standard.

Therefore, in this embodiment, a blocking protrusion portion 33 is formed on the rear end of the sliding sheet 30, and a shifting protrusion portion 34 that is exposed from the engaging recessed slot 111 is formed between the front end and the rear end of the sliding sheet 30. A second opening OP2 corresponding to the shifting protrusion portion 34 is formed on the slot wall of the engaging recessed slot 111, so that the shifting protrusion portion 34 can be exposed from the engaging recessed slot 111 through the second opening OP2.

Figure 10:
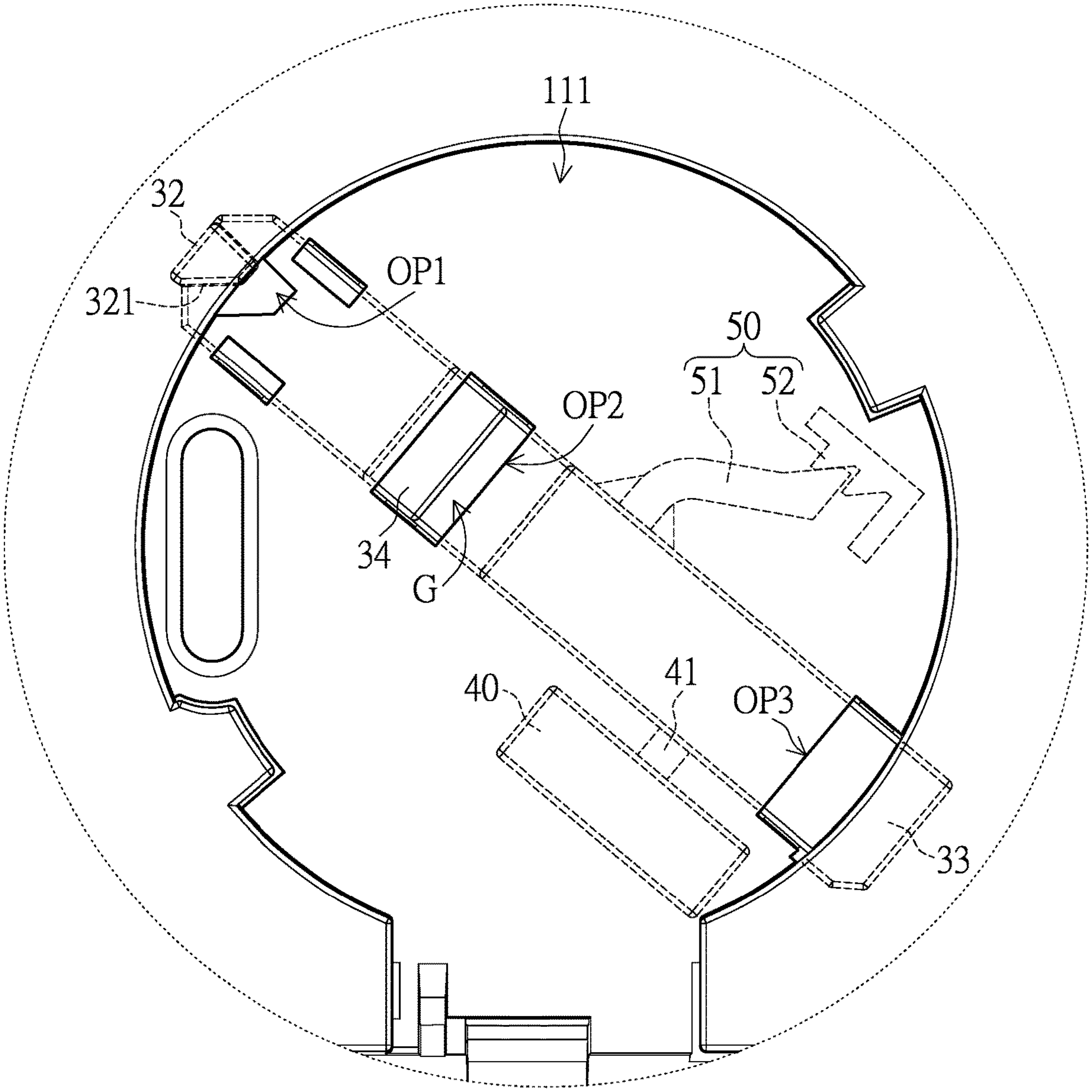
FIG. 10 is a schematic view of a shifting protrusion portion of the sliding sheet of the one-time activation smoke alarm according to the first embodiment of the present disclosure before being shifted.

Furthermore, before the smoke alarm body 100 turns on the detection function, the sliding sheet 30 is located at the first position (as shown in FIG. 7). At this time, the shifting protrusion portion 34 is unable to be shifted forward. After the smoke alarm body 100 turns on the detection function and is removed from the wall-hanging base 900 due to the smoke alarm body 100 reaching the end of product life, the sliding sheet 30 is located at the second position (as shown in FIG. 10). A gap G is then formed between the shifting protrusion portion 34 and the second opening OP2 for allowing a tool (e.g., a flathead screwdriver) or a fingernail to enter the gap G, and the shifting protrusion portion 34 is able to be shifted forward by the tool or the fingernail.

Figure 11:
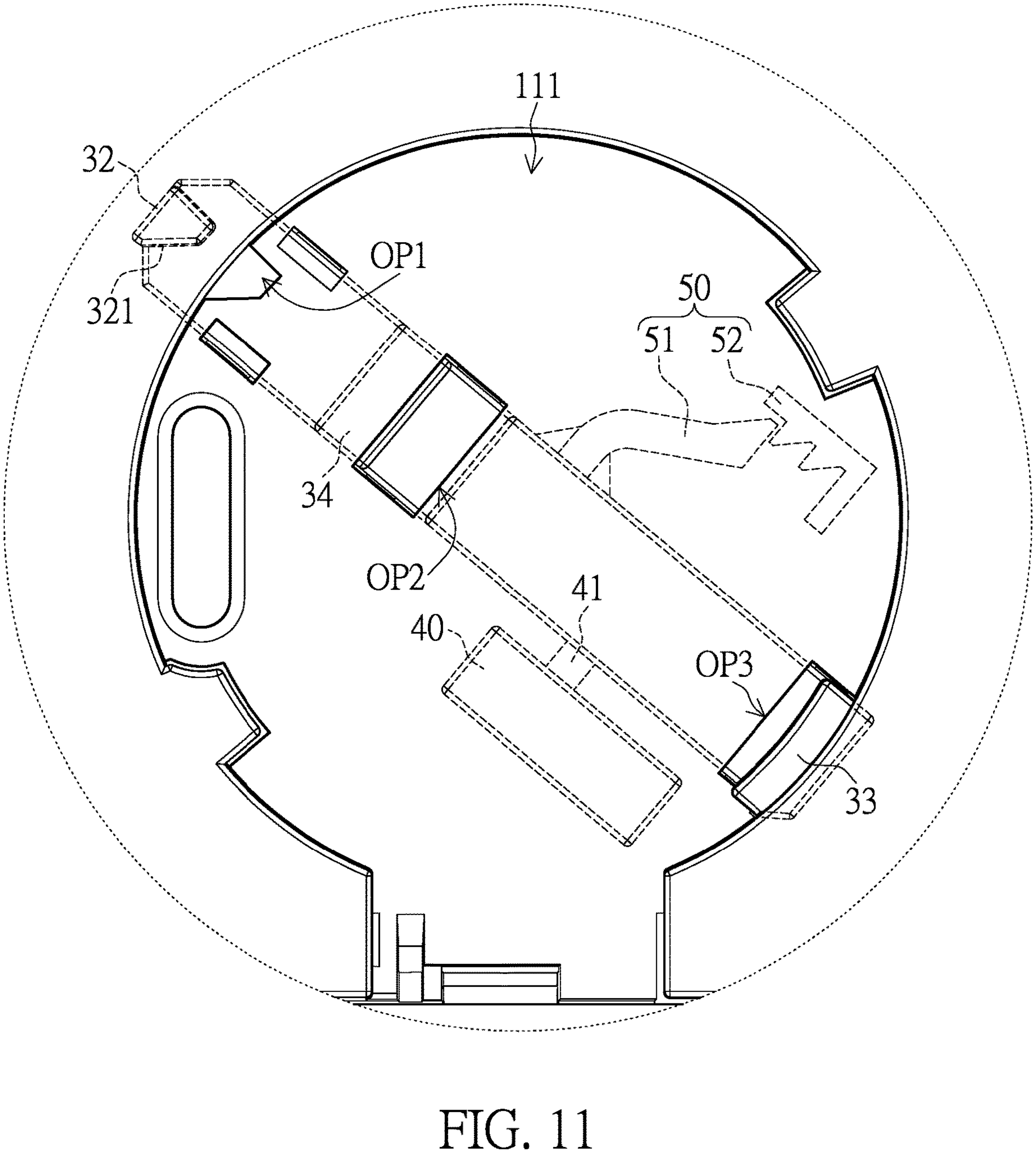
FIG. 11 is a schematic view of a shifting protrusion portion of the sliding sheet of the one-time activation smoke alarm according to the first embodiment of the present disclosure after being shifted.

In other words, when the smoke alarm body 100 reaches the end of product life and is removed from the wall-hanging base 900, the tool or the fingernail can be utilized to enter the gap G formed between the shifting protrusion portion 34 and the second opening OP2 for shifting forward the shifting protrusion portion 34. When the shifting protrusion portion 34 is shifted forward from the second position (as shown in FIG. 10) to a third position (as shown in FIG. 11), the shifting protrusion portion 34 synchronously moves the slider 41 of the slide switch 40 forward from the turned-on position to a discharging position so that the smoke alarm body 100 turns on a discharging function. Since the sliding sheet 30 is connected to the backward-proofing mechanism 50, the sliding sheet 30 is unable to move backward from the third position to the second position, and the slider 41 of the slide switch 40 is unable to move backward from the discharging position to the turned-on position such that the smoke alarm body 100 is unable to turn off the discharging function after turning on the discharging function. Moreover, when the sliding sheet 30 is located in the third position, the blocking protrusion portion 33 extends into the engaging recessed slot 111 and becomes exposed from being hidden, and the blocking protrusion portion 33 interferes with the engaging protrusion platform 901, such that the smoke alarm body 100 is unable to be mounted on the wall-hanging base 900 again after the discharging function is turned-on. Therefore, the smoke alarm body 100 that has reached the end of product life can be prevented from being mounted back on the wall-hanging base 900 again to cause serious threats to safety.

Furthermore, a third opening OP3 corresponding to the blocking protrusion portion 33 is formed on the slot wall of the engaging recessed slot 111. When the sliding sheet 30 moves from the second position to be located in the third position, the blocking protrusion portion 33 extends into the engaging recessed slot 111 through the third opening OP3, and the abutting protrusion portion 9013 of the engaging protrusion platform 901 interferes with the blocking protrusion portion 33 extended into the engaging recessed slot 111. Therefore, the engaging protrusion platform 901 and the engaging recessed slot 111 are unable to fixedly engage with each other, such the smoke alarm body 100 is unable to be mounted on the wall-hanging base 900 again.

Reference is made to FIG. 12 to FIG. 22, which illustrate a one-time activation smoke alarm provided by a second embodiment of the present disclosure. Components in the figures that are similar to that of the first embodiment are marked with the same numerals.

Figure 12:
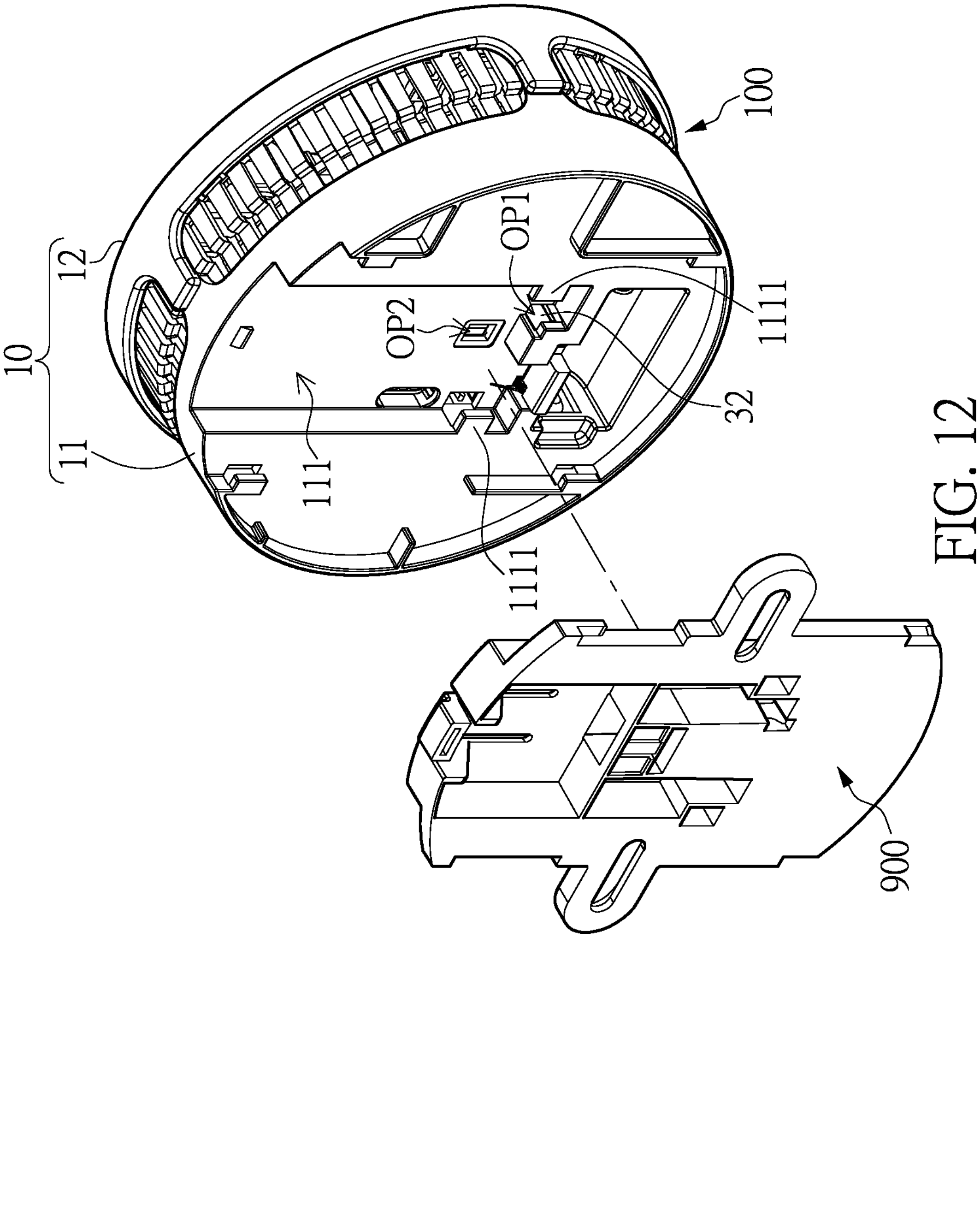
FIG. 12 is a schematic perspective view of a smoke alarm body and a wall-hanging base of a one-time activation smoke alarm according to a second embodiment of the present disclosure.

As shown in FIG. 12, in the present disclosure, the one-time activation smoke alarm includes a smoke alarm body 100 and a wall-hanging base 900. The smoke alarm body 10 can detect abnormal smoke in the environment, and emit audio or light alarms when abnormal smoke is detected in the environment. Furthermore, the smoke alarm body 100 can be disposed on a wall surface (e.g., a ceiling of a living room or a kitchen) via the wall-hanging base 900.

Figure 13:
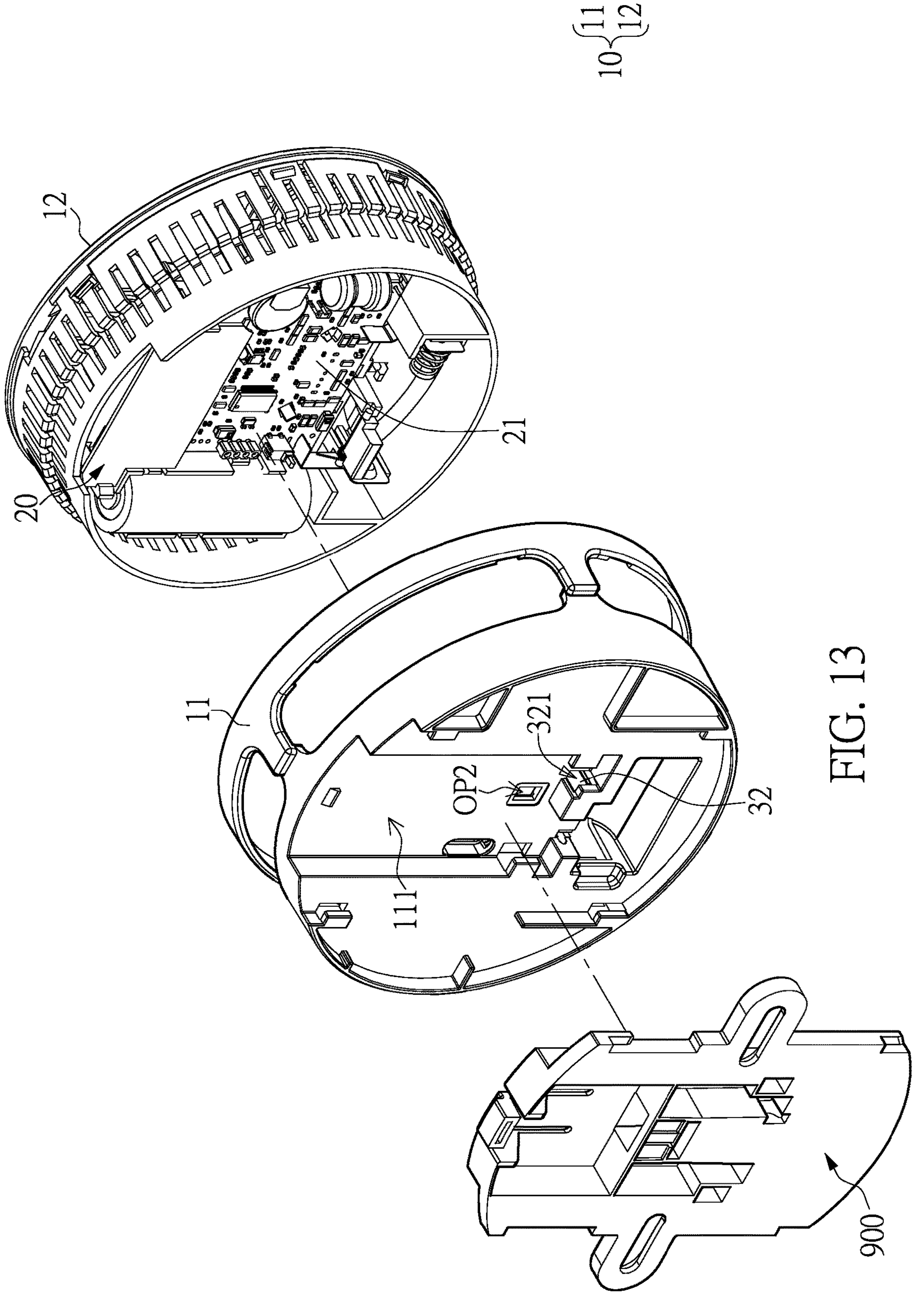
FIG. 13 is an exploded view of the one-time activation smoke alarm according to the second embodiment of the present disclosure.
Figure 14:
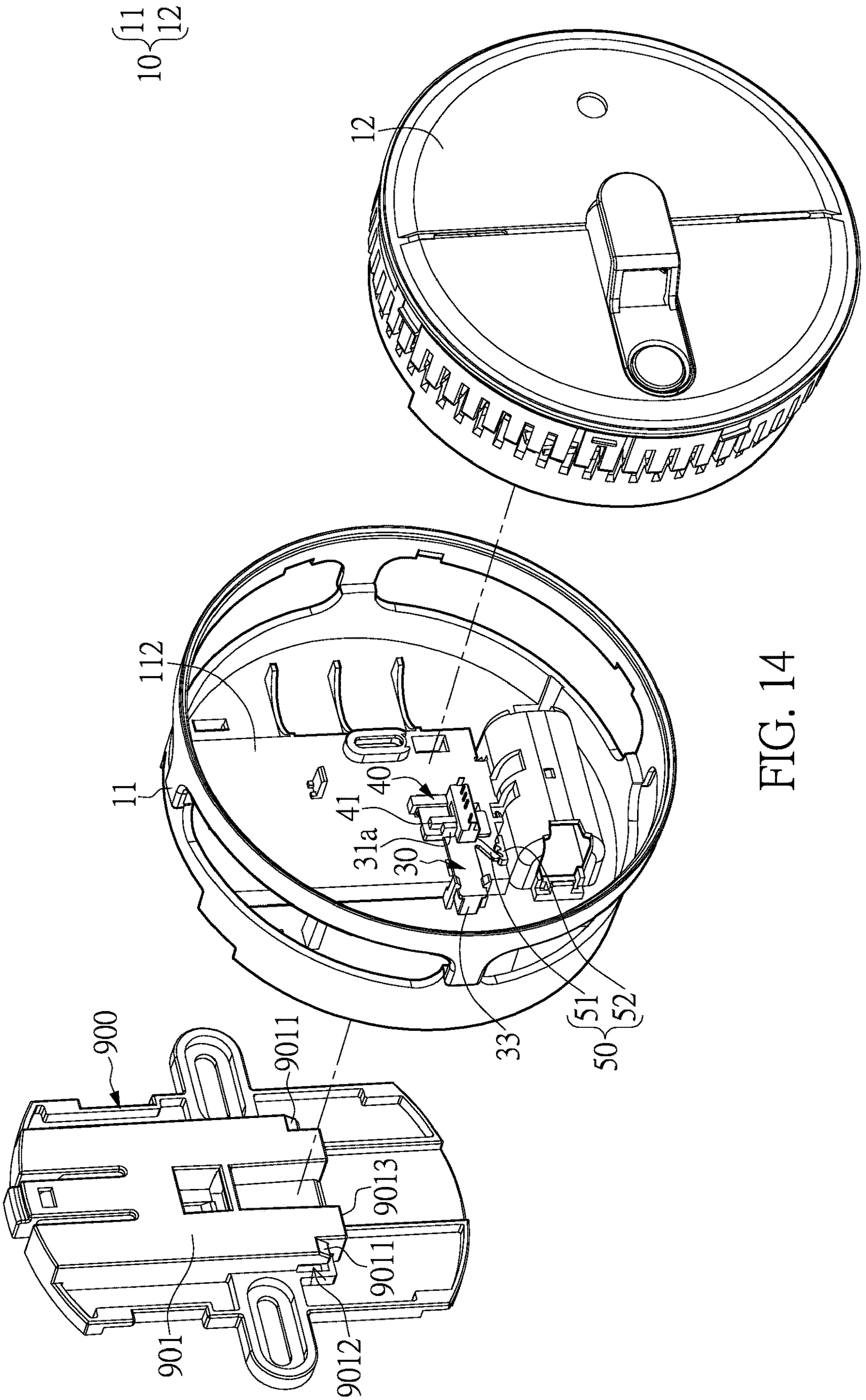
FIG. 14 is another exploded view of the one-time activation smoke alarm according to the second embodiment of the present disclosure.

Moreover, the smoke alarm body 100 includes a case 10, and an engaging recessed slot 111 is recessed at one side of a bottom of the case 10 (as shown in FIG. 13), so that a supporting protrusion platform 112 protrudes from a corresponding position on another side of the bottom of the case (as shown in FIG. 14).

In this embodiment, the case 10 can include a first case 11 and a second case 12 that are assembled to each other, and the engaging recessed slot 111 and the supporting protrusion platform 112 can be formed on two opposite sides of a bottom of the first case 11. The first case 11 can be a bottom case, the second case 12 can be a top case, and an accommodating space can be defined between the first case 11 and the second case 12. The smoke alarm body 100 includes a smoke detector element 20, and the smoke detector element 20 can be accommodated in the accommodating space defined between the first case 11 and the second case 12. As a manner of implementing the smoke detecting unit 20 is not limited in this embodiment, the smoke detecting unit 20 can be a heat-sensitive detecting unit, a smoke-sensitive detecting unit, or a heat-sensitive and smoke-sensitive compound detecting unit, but is not limited thereto.

The smoke alarm body 100 further includes a sliding sheet 30, and the sliding sheet 30 is slidably disposed on the supporting protrusion platform 112 (as shown in FIG. 14). In this embodiment, the supporting protrusion platform 112 is substantially rectangular-shaped, and the sliding sheet 30 is substantially irregularly-shaped (substantially shaped in the letter Y). Furthermore, the sliding sheet 30 is capable of sliding to shift the slide switch 40 for the smoke alarm body 100 to turn on a detection function. That is, when the sliding sheet 30 slides, the slide switch 40 is synchronously driven to slide, so that the smoke alarm body 100 is powered on to turn on the detection function. In this embodiment, a protrusion block 31*a* is formed on a lateral surface of the sliding sheet 30, and the slider 41 of the slide switch 40 abuts against the protrusion block 31*a*, such that when the sliding sheet 30 slides, the slider 41 of the slide switch 40 is synchronously moved by a lateral wall of the protrusion block 31*a*.

Furthermore, the slide switch 40 is electrically connected to a circuit board 21 of the smoke detector element 20. That is, the slide switch 40 can be soldered to the circuit board 21 of the smoke detector element 20, or connected to the circuit board 21 of the smoke detector element 20 via wires. The slide switch 40 can be a 1P3T switch, that is, the slider 41 of the slide switch 40 can move between three positions. When the slider 41 of the slide switch 40 is located in a turned-off position (OFF position), the smoke alarm body 100 is in an off-state, and the detection function is not activated. When the slider 41 of the slide switch 40 is located in a turned-on position (ON position), the smoke alarm body 100 is in an on-state, and the smoke alarm body 100 can be controlled to activate the detection function for detecting abnormal smoke in the environment. In addition, when the slider 41 of the slide switch 40 is located in a discharging position, the smoke alarm body 100 can be controlled to be in a discharging state, and the smoke alarm body 100 can be controlled to activate a discharging function so that remaining power can be depleted.

Figure 22:
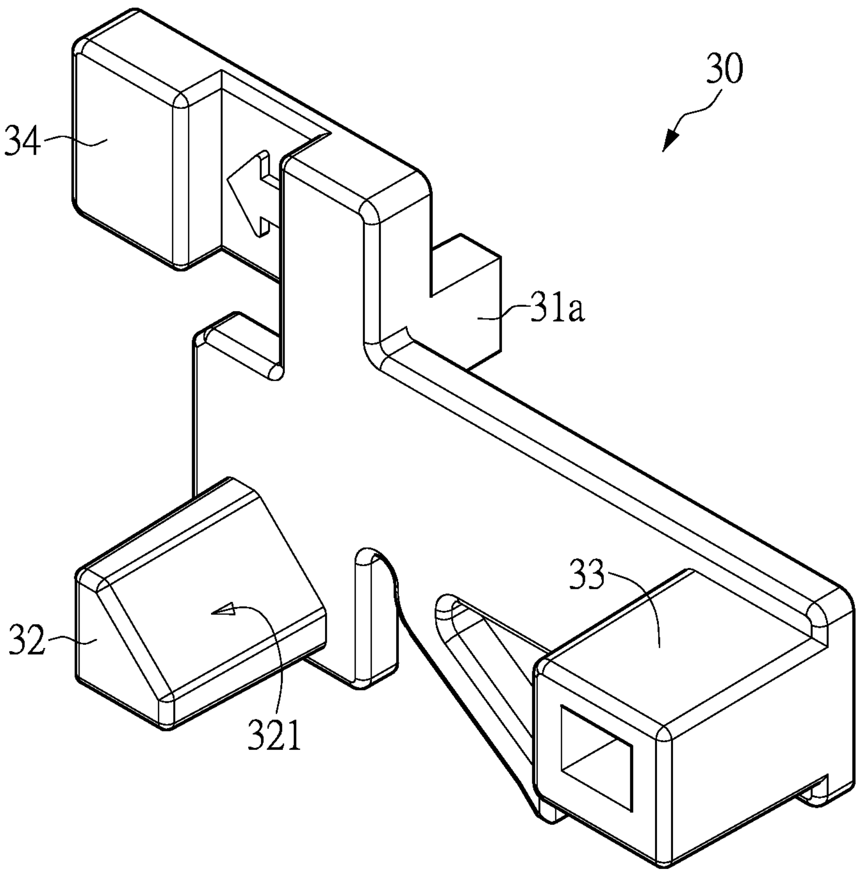
FIG. 22 is a schematic perspective view of the sliding sheet of the one-time activation smoke alarm according to the second embodiment of the present disclosure.

In addition, as shown in FIG. 12 and FIG. 22, a front end of the sliding sheet 30 is forked and has a pressed protrusion portion 32 that extends into the engaging recessed slot 111. Moreover, a first opening OP1 corresponding to the pressed protrusion portion 32 is formed on a slot wall of the engaging recessed slot 111, so that the pressed protrusion portion 32 extends into the engaging recessed slot 111 through the first opening OP1.

As shown in FIG. 14, one side of the wall-hanging base 900 is configured to be disposed on a wall surface, an engaging protrusion platform 901 protrudes from another side of the wall-hanging base 900, and the engaging protrusion platform 901 is substantially rectangle-shaped. Furthermore, the engaging protrusion platform 901 of the wall-hanging base 900 and the engaging recessed slot 111 of the smoke alarm body 100 are capable of being engaged and fixed to each other by manners of straight insertion and engagement, so that the smoke alarm body 100 can be disposed on the wall surface through the wall-hanging base 900.

Furthermore, an engaging protrusion portion 9011 protrudes outward from a periphery of the engaging protrusion platform 901. In this embodiment, two engaging protrusion portions 9011 protrude outward from opposite positions on the periphery of the engaging protrusion platform 901. An engaging protruded block 1111 is recessed from a slot wall of the engaging recessed slot 111. In this embodiment, two engaging protruded blocks 1111 are recessed from opposite positions on the slot wall of the engaging recessed slot 111. Moreover, at least one engaging protruded block 1111 is capable of entering an engaging slot 9012 formed by at least one engaging protrusion portion 9011 by a rotation movement, so that the engaging protrusion platform 901 and the engaging recessed slot 111 are capable of being engaged and fixed to each other by manners of straight insertion and engagement.

Figure 15:
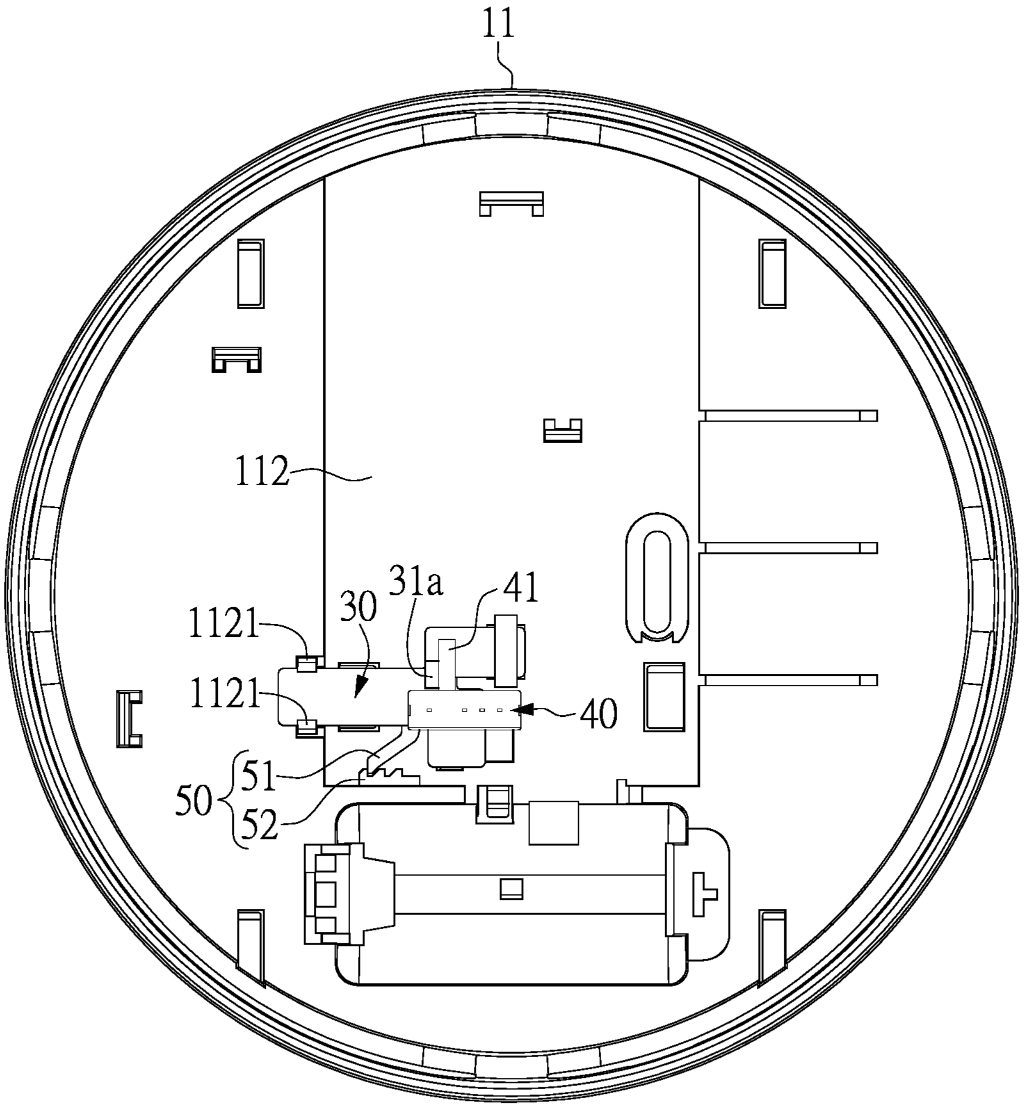
FIG. 15 is a schematic top view of a sliding sheet of the one-time activation smoke alarm located at a first position according to the second embodiment of the present disclosure.
Figure 16:
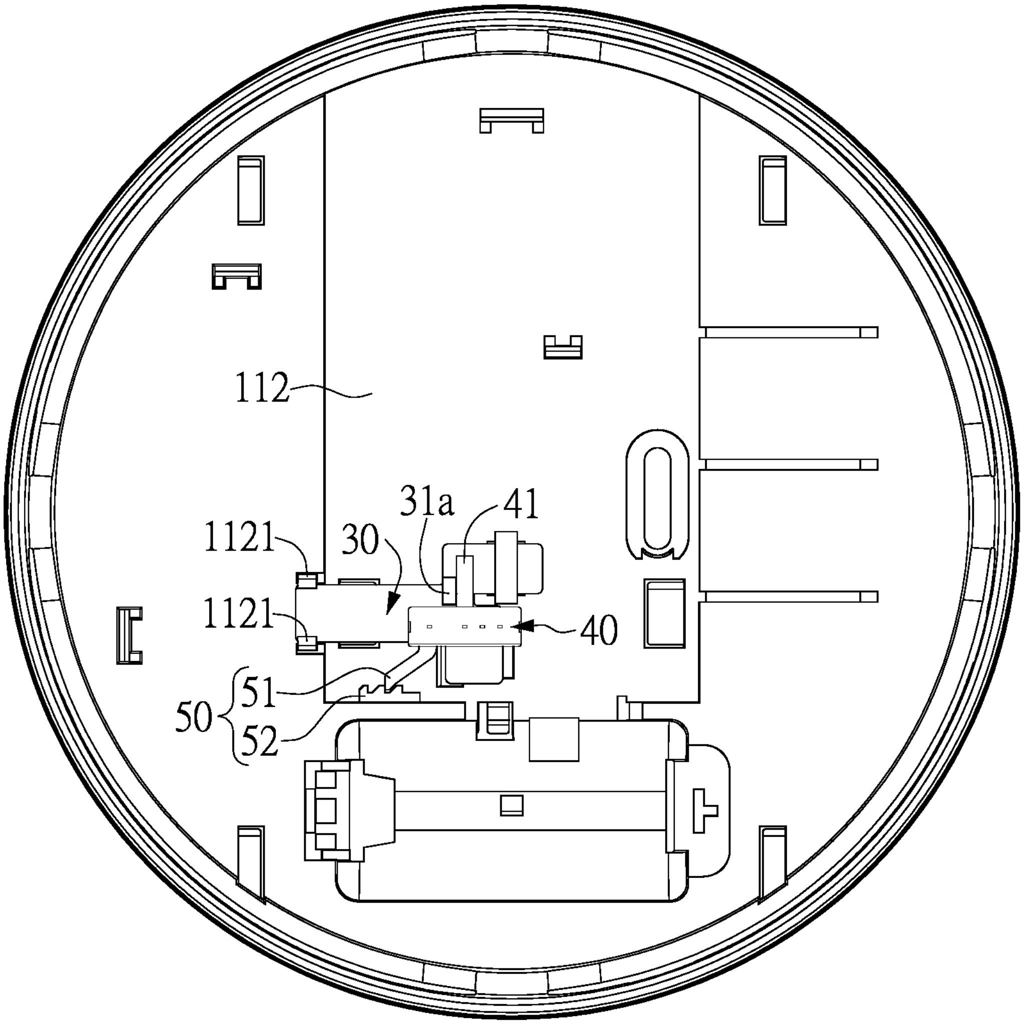
FIG. 16 is a schematic top view of the sliding sheet of the one-time activation smoke alarm located at a second position according to the second embodiment of the present disclosure.
Figure 17:
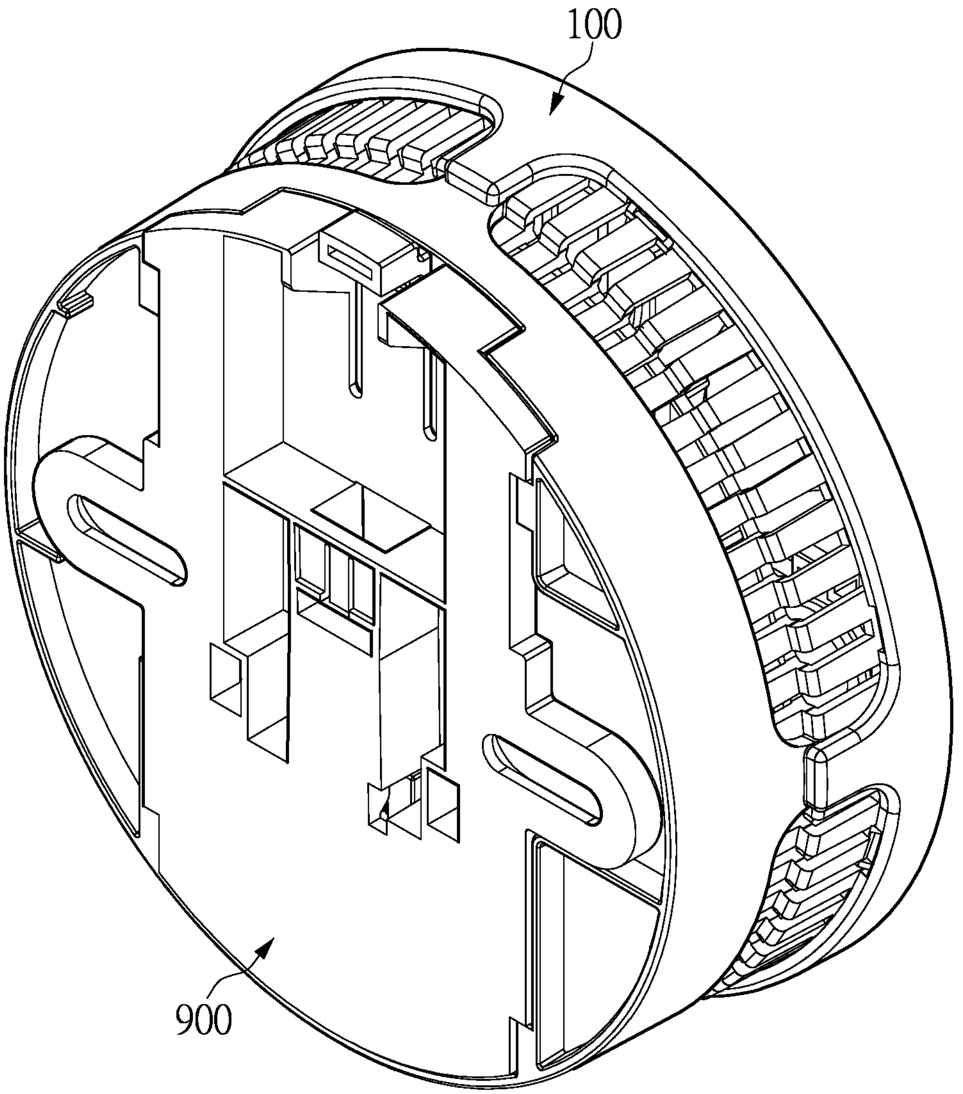
FIG. 17 is a schematic assembly view of the smoke alarm body and the wall-hanging base of the one-time activation smoke alarm according to the second embodiment of the present disclosure.
Figure 18:
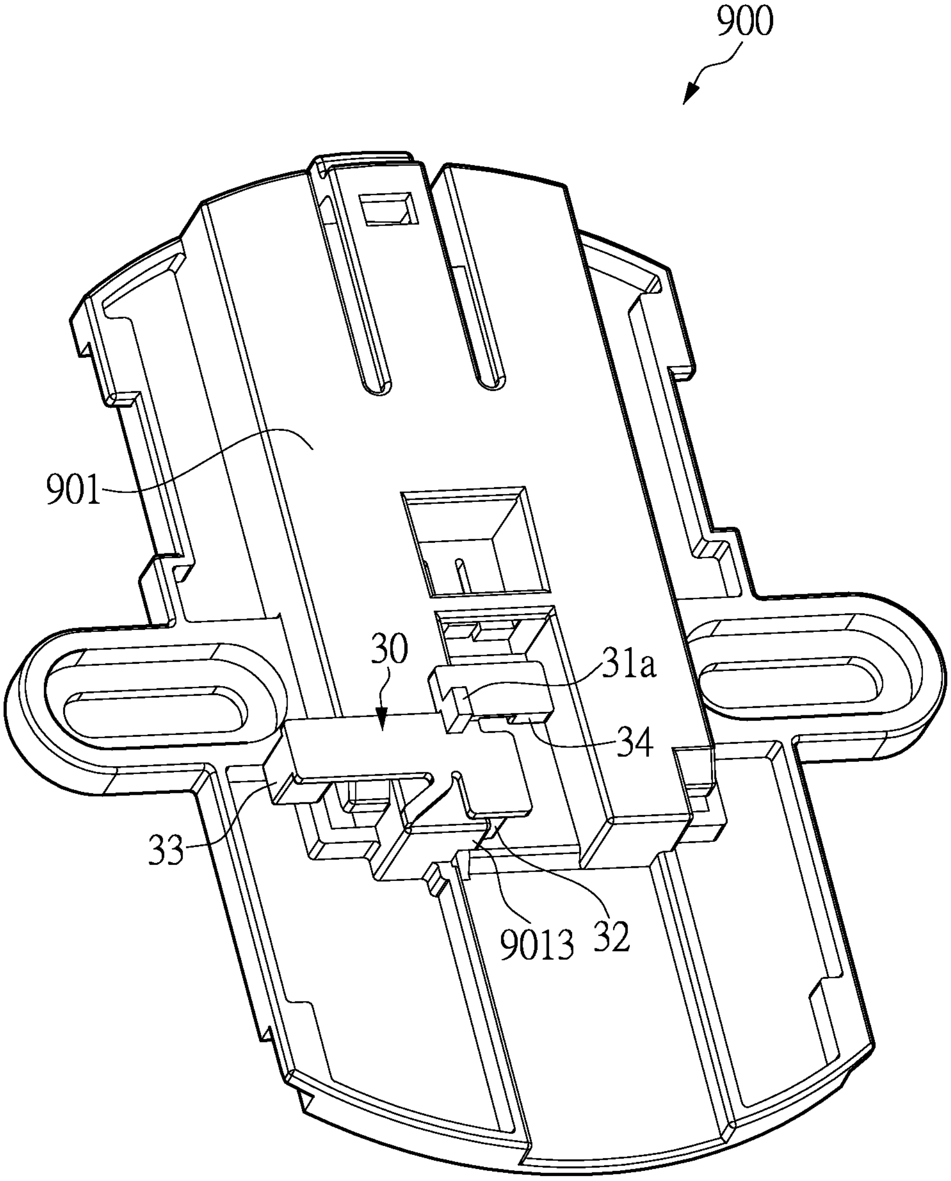
FIG. 18 is a schematic view of the wall-hanging base and the sliding sheet of the one-time activation smoke alarm according to the second embodiment of the present disclosure.

Furthermore, at least one abutting protrusion portion 9013 protrudes outward from the periphery of the engaging protrusion platform 901. Referring to FIG. 15 to FIG. 19, when the engaging protrusion platform 901 and the engaging recessed slot 111 are engaged and fixed to each other, the abutting protrusion portions 9013 of the engaging protrusion platform 901 can abut against a pressed oblique surface 321 formed on the pressed protrusion portion 32 in the engaging recessed slot 111 to move the sliding sheet 30 forward by one position along a longitudinal direction of the sliding sheet 30. Therefore, the sliding sheet 30 is moved from a first position (as shown in FIG. 15) to a second position (as shown in FIG. 16), and the slider 41 of the slide switch 40 is synchronously moved forward from a turned-off position to a turned-on position such that the smoke alarm body 100 is powered on to turn on the detection function. That is, after the smoke alarm body 100 is engaged to the wall-hanging base 900 by a manner of rotation, the detection function can be activated.

In addition, a plurality of limiting hooks 1121 can be formed on the supporting protrusion platform 112, the limiting hooks 1121 are arranged in pairs and opposite to each other along a longitudinal direction of the sliding sheet 30 to limit the sliding sheet 30 to only being able to move along the longitudinal direction of the sliding sheet 30 and to prevent the sliding sheet 30 from detaching from the supporting protrusion platform 112.

Moreover, the sliding sheet is connected to a backward-proofing mechanism 50 that is configured to prevent the sliding sheet 30 from moving backward along the longitudinal direction of the sliding sheet 30. Therefore, after the sliding sheet 30 is moved forward from the first position to the second position, the sliding sheet 30 is unable to move backward from the second position to the first position, and the slider 41 of the slide switch 40 is unable to move backward from the turned-on position to the turned-off position, such that the smoke alarm body 100 is unable to turn off the detection function after turning on the detection function.

In detail, the backward-proofing mechanism 50 includes an elastic arm 51 that extends outward from a side edge of the sliding sheet 30 and a ratchet structure 52 formed on the supporting protrusion platform 112, and an inclined surface of a free end of the elastic arm 51 is in contact with an inclined surface of the ratchet structure 52. When the sliding sheet 30 is moved forward, the inclined surface of the ratchet structure 52 abuts against the inclined surface of the elastic arm 51, so that the elastic arm 51 is elastically deformed and then recovers to engage with the ratchet structure 52, such that the sliding sheet 30 is capable of moving forward by one position. Moreover, a straight surface of the free end of the elastic arm 51 abuts against a straight surface of the ratchet structure 52, so that the sliding sheet 30 is unable to move backward to the original position. Therefore, the backward-proofing mechanism 50 of this embodiment can prevent the sliding sheet 30 from moving backward.

Furthermore, when the smoke alarm of the second embodiment has reached the end of product life and the smoke alarm needs to be discarded, the smoke alarm needs to discharge electric power to prevent any hazards that may be caused by the remaining electric power, thereby meeting the requirement of the UL 217 standard.

Therefore, in this embodiment, a blocking protrusion portion 33 is formed on the rear end of the sliding sheet 30, and a shifting protrusion portion 34 that is exposed from the engaging recessed slot 111 is formed on the forked front end of the sliding sheet 30. A second opening OP2 corresponding to the shifting protrusion portion 34 is formed on the slot wall of the engaging recessed slot 111, so that the shifting protrusion portion 34 can be exposed from the engaging recessed slot 111 through the second opening OP2.

Figure 19:
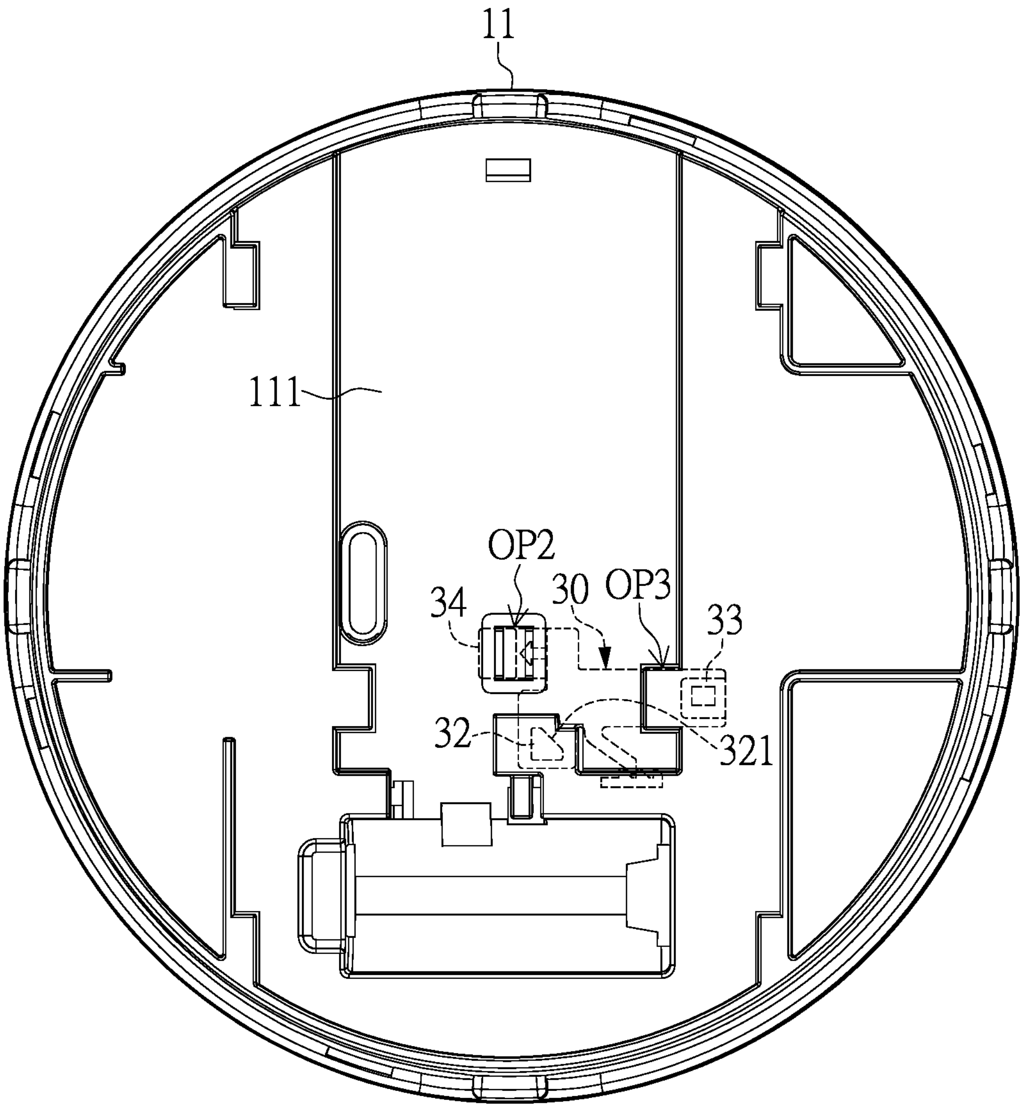
FIG. 19 is a schematic view of the sliding sheet of the one-time activation smoke alarm located at the second position according to the second embodiment of the present disclosure.

Furthermore, before the smoke alarm body 100 turns on the detection function, the sliding sheet 30 is located at the first position. At this time, the shifting protrusion portion 34 is unable to be shifted forward. After the smoke alarm body 100 turns on the detection function and is removed from the wall-hanging base 900 due to the smoke alarm body 100 reaching the end of product life, the sliding sheet 30 is located at the second position (as shown in FIG. 19). A gap G is then formed between the shifting protrusion portion 34 and the second opening OP2 for allowing a tool (e.g., a flathead screwdriver) or a fingernail to enter the gap G, and the shifting protrusion portion 34 is able to be shifted forward by the tool or the fingernail.

Figure 20:
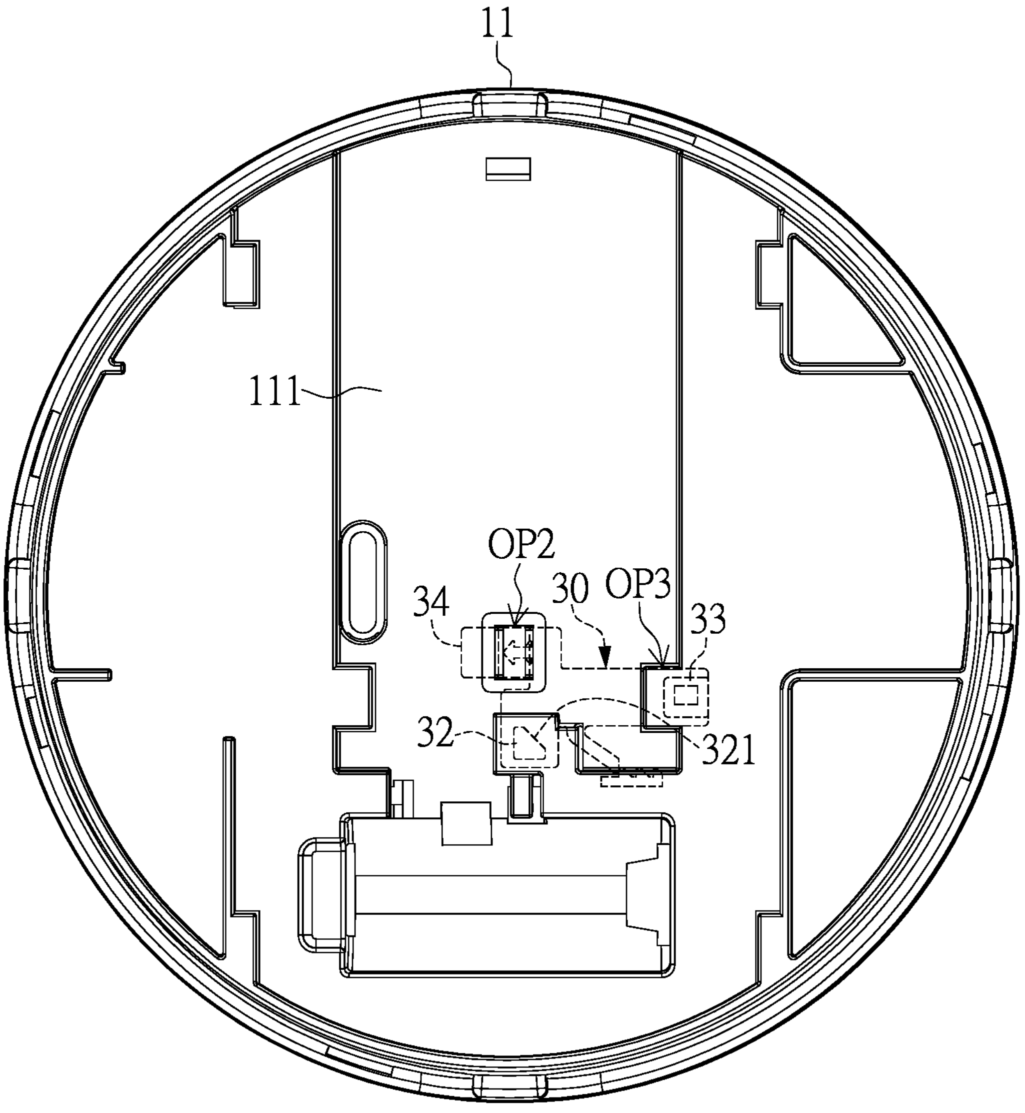
FIG. 20 is a schematic view of the sliding sheet of the one-time activation smoke alarm located at a third position according to the second embodiment of the present disclosure.
Figure 21:
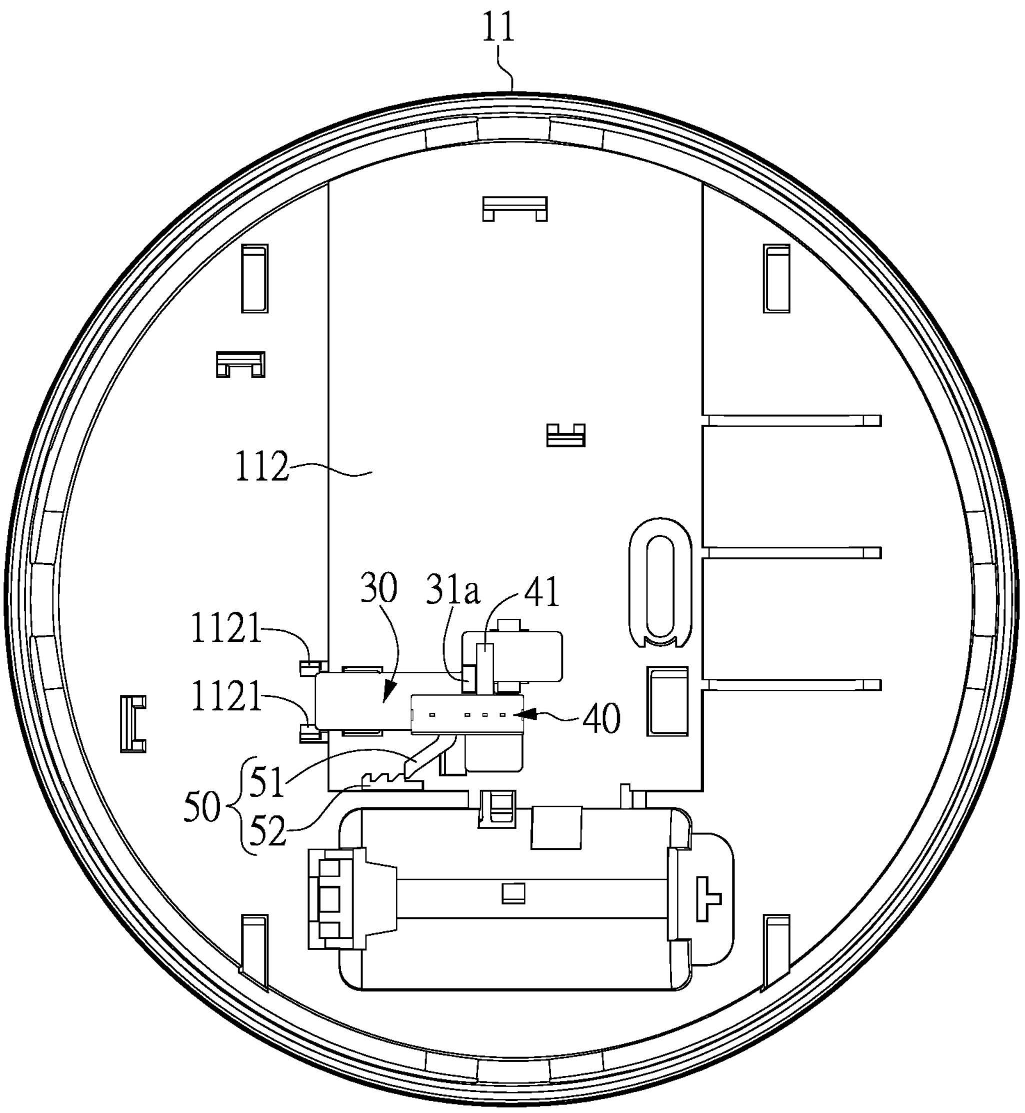
FIG. 21 is a schematic top view of the sliding sheet of the one-time activation smoke alarm located at the third position according to the second embodiment of the present disclosure.

In other words, when the smoke alarm body 100 reaches the end of product life and is removed from the wall-hanging base 900, the tool or the fingernail can be utilized to enter the gap G formed between the shifting protrusion portion 34 and the second opening OP2 for shifting forward the shifting protrusion portion 34. When the shifting protrusion portion 34 is shifted forward from the second position (as shown in FIG. 19) to a third position (as shown in FIG. 20), the shifting protrusion portion 34 synchronously moves the slider 41 of the slide switch 40 forward from the turned-on position to a discharging position (as shown in FIG. 21) so that the smoke alarm body 100 turns on a discharging function. Since the sliding sheet 30 is connected to the backward-proofing mechanism 50, the sliding sheet 30 is unable to move backward from the third position to the second position, and the slider 41 of the slide switch 40 is unable to move backward from the discharging position to the turned-on position such that the smoke alarm body 100 is unable to turn off the discharging function after turning on the discharging function. Moreover, when the sliding sheet 30 is located in the third position, the blocking protrusion portion 33 extends into the engaging recessed slot 111 and becomes exposed from being hidden, and the blocking protrusion portion 33 interferes with the engaging protrusion platform 901, such that the smoke alarm body 100 is unable to be mounted on the wall-hanging base 900 again after the discharging function is turned-on. Therefore, the smoke alarm body 100 that has reached the end of product life can be prevented from being mounted back on the wall-hanging base 900 again to cause serious threats to safety.

Furthermore, a third opening OP3 corresponding to the blocking protrusion portion 33 is formed on the slot wall of the engaging recessed slot 111. When the sliding sheet 30 moves from the second position to be located in the third position, the blocking protrusion portion 33 extends into the engaging recessed slot 111 through the third opening OP3, and the engaging protrusion portion 9011 of the engaging protrusion platform 901 interferes with the blocking protrusion portion 33 extended into the engaging recessed slot 111. Therefore, the engaging protrusion platform 901 and the engaging recessed slot 111 are unable to fixedly engage with each other, such the smoke alarm body 100 is unable to be mounted on the wall-hanging base 900 again.

Beneficial Effects of the Embodiment

In conclusion, in the one-time activation smoke alarm provided by the present disclosure, an engaging recessed slot is recessed at a bottom of the case of the smoke alarm body, an engaging protrusion platform protrudes from the wall-hanging base, and the engaging protrusion platform and the engaging recessed slot are capable of being engaged and fixed to each other by manners of rotation and engagement. Thus, the smoke alarm body can be disposed on a wall surface through the wall-hanging base. A supporting protrusion platform protrudes from the bottom of the case, and a sliding sheet is slidably disposed on the supporting protrusion platform. A front end of the sliding sheet has a pressed protrusion portion that extends into the engaging recessed slot, and an abutting protrusion portion protrudes outward from a periphery of the engaging protrusion platform. Therefore, when the engaging protrusion platform and the engaging recessed slot are rotated and engaged to each other, the abutting protrusion portion abuts against a pressed oblique surface formed on the pressed protrusion portion in the engaging recessed slot to move the sliding sheet forward by one position. Moreover, the slide switch is synchronously moved forward by one position such that the smoke alarm body is powered on to turn on the detection function. In addition, the sliding sheet is connected to a backward-proofing mechanism that prevents the sliding sheet to move backward after moving forward, such that the smoke alarm body is unable to turn off the detection function after turning on the detection function.

Furthermore, a blocking protrusion portion is formed on a rear end of the sliding sheet, and a shifting protrusion portion is formed between the front end and the rear end of the sliding sheet. A smoke alarm body that has reached the end of product life can be removed from the wall-hanging base, and the shifting protrusion portion can be shifted to move the sliding sheet forward by one position. The slide switch is synchronously moved forward by one position so that the smoke alarm body turns on the discharging function. Moreover, the sliding sheet is connected to the backward-proofing mechanism, so that the sliding sheet is unable to move backward after being moved forward, and the smoke alarm body is unable to turn off the discharging function after turning on the discharging function. At this time, a blocking protrusion portion extends into the engaging recessed slot and becomes exposed from being hidden, and the blocking protrusion portion interferes with the engaging protrusion platform. In this way, the smoke alarm body is unable to be mounted back to the wall-hanging base after turning on the discharging function. Accordingly, the smoke alarm body that has reached the end of product life can be prevented from being mounted back on the wall-hanging base again by a third party to cause serious threat to safety.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A one-time activation smoke alarm, comprising:

a smoke alarm body, including:

a case, wherein an engaging recessed slot is recessed at one side of a bottom of the case, so that a supporting protrusion platform protrudes from a corresponding position on another side of the bottom of the case; and a sliding sheet slidably disposed on the supporting protrusion platform, wherein the sliding sheet is capable of sliding to shift a slide switch for the smoke alarm body to turn on a detection function, and a front end of the sliding sheet has a pressed protrusion portion that extends into the engaging recessed slot; and a wall-hanging base, wherein one side of the wall-hanging base is configured to be disposed on a wall surface, an engaging protrusion platform protrudes from another side of the wall-hanging base, and at least one abutting protrusion portion protrudes outward from a periphery of the engaging protrusion platform;

wherein the engaging protrusion platform and the engaging recessed slot are capable of being engaged and fixed to each other, so that the at least one abutting protrusion portion abuts against a pressed oblique surface formed on the pressed protrusion portion in the engaging recessed slot to move the sliding sheet forward from a first position to a second position, and a slider of the slide switch is synchronously moved forward from a turned-off position to a turned-on position such that the smoke alarm body is powered on to turn on the detection function; wherein the sliding sheet is connected to a backward-proofing mechanism that is configured to prevent the sliding sheet from moving backward such that the sliding sheet is unable to move backward from the second position to the first position, and the slider of the slide switch is unable to move backward from the turned-on position to the turned-off position such that the smoke alarm body is unable to turn off the detection function after turning on the detection function.

2. The one-time activation smoke alarm according to claim 1, wherein a blocking protrusion portion is formed on a rear end of the sliding sheet, and a shifting protrusion portion that is exposed from the engaging recessed slot is formed on the sliding sheet; wherein, when the sliding sheet is located in the second position, the shifting protrusion portion is capable of being pushed to move the sliding sheet forward from the second position to a third position, and the shifting protrusion portion synchronously moves the slider of the slide switch forward from the turned-on position to a discharging position so that the smoke alarm body turns on a discharging function; wherein the sliding sheet is connected to the backward-proofing mechanism such that the sliding sheet is unable to move backward from the third position to the second position, and the slider of the slide switch is unable to move backward from the discharging position to the turned-on position such that the smoke alarm body is unable to turn off the discharging function after turning on the discharging function; wherein, when the sliding sheet is located in the third position, the blocking protrusion portion extends into the engaging recessed slot, and the blocking protrusion portion interferes with the engaging protrusion platform, such that the smoke alarm body is unable to be mounted on the wall-hanging base again after the discharging function is turned-on.

3. The one-time activation smoke alarm according to claim 2, wherein the backward-proofing mechanism includes an elastic arm that extends outward from a side edge of the sliding sheet and a ratchet structure formed on the supporting protrusion platform, and an inclined surface of a free end of the elastic arm is in contact with an inclined surface of the ratchet structure; wherein, when the sliding sheet is moved forward, the inclined surface of the ratchet structure abuts against the inclined surface of the elastic arm, so that the elastic arm is elastically deformed and then recovers to engage with the ratchet structure, such that a straight surface of the free end of the elastic arm abuts against a straight surface of the ratchet structure to prevent the sliding sheet from moving backward.

4. The one-time activation smoke alarm according to claim 1, wherein the case includes a first case and a second case that are assembled to each other, and the engaging recessed slot and the supporting protrusion platform are formed on two opposite sides of a bottom of the first case; wherein the smoke alarm body further includes a smoke detector element that is accommodated in an accommodating space defined between the first case and the second case, and the slide switch is electrically connected to the smoke detector element.

5. The one-time activation smoke alarm according to claim 1, wherein a concave slot is formed between the front end and the rear end of the sliding sheet, and the slider of the slide switch extends into the concave slot, such that when the sliding sheet is moved forward, the slider of the slide switch is synchronously moved through the concave slot.

6. The one-time activation smoke alarm according to claim 1, wherein an engaging protrusion portion protrudes outward from a periphery of the engaging protrusion platform, an engaging protruded block is recessed from a slot wall of the engaging recessed slot, and the engaging protruded block is capable of entering an engaging slot formed by the engaging protrusion portion by a rotation movement.

7. The one-time activation smoke alarm according to claim 2, wherein a first opening corresponding to the pressed protrusion portion is formed on a slot wall of the engaging recessed slot, so that the pressed protrusion portion extends into the engaging recessed slot through the first opening.

8. The one-time activation smoke alarm according to claim 7, wherein a second opening corresponding to the shifting protrusion portion is formed on the slot wall of the engaging recessed slot, so that the shifting protrusion portion is exposed from the engaging recessed slot through the second opening; wherein, when the sliding sheet is located in the second position, a gap is formed between the shifting protrusion portion and the second opening for allowing a tool to enter the gap and shift the shifting protrusion portion.

9. The one-time activation smoke alarm according to claim 8, wherein a third opening corresponding to the blocking protrusion portion is formed on the slot wall of the engaging recessed slot, and when the sliding sheet is located in the third position, the blocking protrusion portion extends into the engaging recessed slot through the third opening.

10. The one-time activation smoke alarm according to claim 1, wherein a plurality of limiting hooks are formed on the supporting protrusion platform, and the sliding sheet is located between the limiting hooks; wherein the limiting hooks are arranged in pairs and opposite to each other along a longitudinal direction of the sliding sheet.

11. The one-time activation smoke alarm according to claim 1, wherein the engaging protrusion platform and the engaging recessed slot are capable of being engaged and fixed to each other by manners of rotation and engagement.

12. The one-time activation smoke alarm according to claim 1, wherein the engaging protrusion platform and the engaging recessed slot are capable of being engaged and fixed to each other by manners of straight insertion and engagement.

* * * * *